United States Patent
Lilleland et al.

(10) Patent No.: US 12,215,994 B2
(45) Date of Patent: Feb. 4, 2025

(54) DEVICES FOR DETECTING MATERIAL DEPOSITS IN FLUID FLOW CONDUITS

(71) Applicant: Watlow Electric Manufacturing Company, St. Louis, MO (US)

(72) Inventors: John Lilleland, Morgan Hill, CA (US); Grant Brewer, St. Louis, MO (US); Li Zheng, St. Louis, MO (US); Terry Madson, Campbell, CA (US); Sanhong Zhang, Ballwin, MO (US); Miranda Pizzella, St. Louis, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 203 days.

(21) Appl. No.: 17/479,880

(22) Filed: Sep. 20, 2021

(65) Prior Publication Data

US 2022/0090951 A1 Mar. 24, 2022

Related U.S. Application Data

(60) Provisional application No. 63/080,233, filed on Sep. 18, 2020.

(51) Int. Cl.
| | |
|---|---|
| *G01F 1/88* | (2006.01) |
| *G01K 13/02* | (2021.01) |
| *G01N 17/00* | (2006.01) |
| *G01N 25/18* | (2006.01) |
| *G01K 13/024* | (2021.01) |

(Continued)

(52) U.S. Cl.
CPC ............. *G01F 1/88* (2013.01); *G01N 17/008* (2013.01); *G01N 25/18* (2013.01); *G01K 13/024* (2021.01); *G01K 13/026* (2021.01); *G01N 25/00* (2013.01); *G01N 25/72* (2013.01)

(58) Field of Classification Search
CPC ........ G01F 1/88; G01N 17/008; G01N 25/18; G01N 25/00; G01N 25/72; G01K 13/024; G01K 13/026
See application file for complete search history.

(56) References Cited

U.S. PATENT DOCUMENTS

| | | | | |
|---|---|---|---|---|
| 4,138,878 A | * | 2/1979 | Holmes ................. | G01N 25/18 |
| | | | | 73/61.62 |
| 4,813,284 A | * | 3/1989 | Miller .................. | G01F 23/241 |
| | | | | 73/49.2 |

(Continued)

FOREIGN PATENT DOCUMENTS

| | | |
|---|---|---|
| CN | 110967138 A | 4/2020 |
| CN | 111457861 A | 7/2020 |

(Continued)

OTHER PUBLICATIONS

Search Report issued in corresponding TW Application No. 110135184, dated Jan. 10, 2023, 3 pages.

(Continued)

*Primary Examiner* — Nathaniel T Woodward
*Assistant Examiner* — Philip L Cotey
(74) *Attorney, Agent, or Firm* — Burris Law, PLLC

(57) ABSTRACT

A sensor for detecting material deposits in a fluid flow conduit includes a body and an array of pairs of temperature sensors disposed within the body, where each pair of temperature sensors is spaced a distance apart along a primary flow direction of the fluid flow conduit.

27 Claims, 21 Drawing Sheets

(51) Int. Cl.
*G01N 25/00* (2006.01)
*G01N 25/72* (2006.01)

(56) References Cited

U.S. PATENT DOCUMENTS

| | | | | |
|---|---|---|---|---|
| 6,386,272 | B1* | 5/2002 | Starner | G01B 7/06 |
| | | | | 374/147 |
| 6,499,876 | B1* | 12/2002 | Baginksi | G01N 17/008 |
| | | | | 374/7 |
| 9,011,608 | B2* | 4/2015 | Amundsen | G01N 17/008 |
| | | | | 374/30 |
| 9,134,165 | B2* | 9/2015 | Kirst | G01F 1/8477 |
| 9,176,044 | B2* | 11/2015 | Bosbach | G01K 7/16 |
| 9,874,480 | B2* | 1/2018 | Hoffmann | G01K 1/026 |
| 2007/0005272 | A1* | 1/2007 | Gysling | G01N 9/002 |
| | | | | 702/50 |
| 2007/0025413 | A1* | 2/2007 | Hays | F28F 19/00 |
| | | | | 374/7 |
| 2008/0041139 | A1* | 2/2008 | Baller | G01N 17/008 |
| | | | | 73/61.62 |
| 2008/0056946 | A1* | 3/2008 | Ahmad | C12Q 1/26 |
| | | | | 422/68.1 |
| 2008/0163692 | A1* | 7/2008 | Huang | G01K 1/143 |
| | | | | 374/E1.019 |
| 2008/0289412 | A1* | 11/2008 | Huck | G01F 1/684 |
| | | | | 73/204.11 |
| 2009/0084177 | A1* | 4/2009 | Ao | G01F 1/6845 |
| | | | | 73/170.12 |
| 2011/0308548 | A1* | 12/2011 | Amundsen | G01B 21/085 |
| | | | | 374/7 |
| 2014/0177673 | A1* | 6/2014 | Bliss | F28G 15/003 |
| | | | | 374/165 |
| 2015/0020580 | A1* | 1/2015 | Hoffman | G01K 1/026 |
| | | | | 73/61.44 |
| 2018/0292306 | A1* | 10/2018 | Howland | C12Q 1/04 |
| 2019/0032477 | A1* | 1/2019 | Huang | G01N 33/2823 |
| 2019/0234893 | A1* | 8/2019 | Chattoraj | G01B 21/085 |
| 2020/0182705 | A1* | 6/2020 | Griffin | G01K 1/08 |
| 2020/0371068 | A1* | 11/2020 | Rehman | G01N 29/44 |
| 2021/0108917 | A1* | 4/2021 | Hazuku | G01B 21/085 |
| 2021/0123865 | A1* | 4/2021 | Xiong | G01N 21/6486 |
| 2022/0042639 | A1* | 2/2022 | Grande | H05B 1/0244 |

FOREIGN PATENT DOCUMENTS

| | | |
|---|---|---|
| CN | 211010417 U | 7/2020 |
| CN | 111594766 A | 8/2020 |
| CN | 111664823 A | 9/2020 |
| TW | M395825 U | 1/2011 |
| WO | 2011018592 A1 | 2/2011 |
| WO | 2018105142 A1 | 6/2018 |

OTHER PUBLICATIONS

International Search Report for corresponding International Application No. PCT/US2021/071521, mailed Dec. 1, 2021, 13 pages.

* cited by examiner

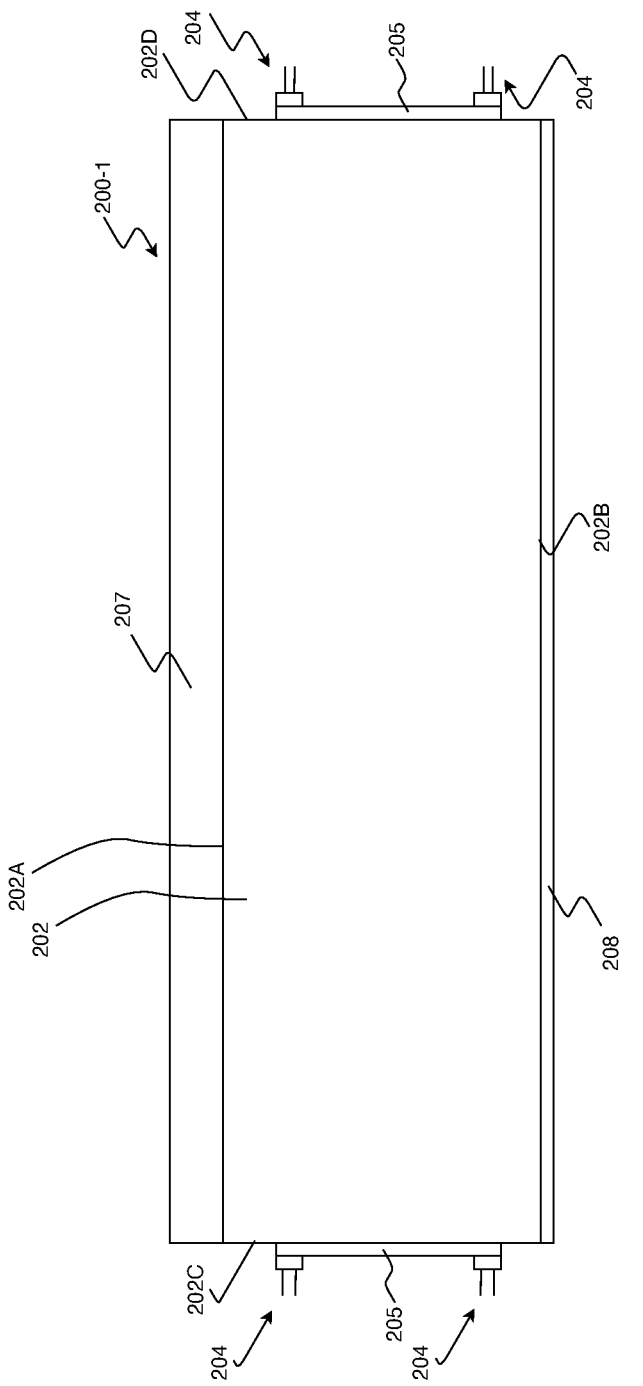
FIG. 2B
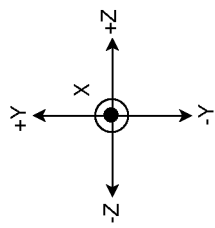

DEVICES FOR DETECTING MATERIAL DEPOSITS IN FLUID FLOW CONDUITS

CROSS-REFERENCE TO RELATED APPLICATION

This application claims priority to and the benefit of U.S. Provisional Application No. 63/080,233 filed on Sep. 18, 2020. The disclosure of the above application is incorporated herein by reference.

FIELD

The present disclosure relates to devices for detecting material deposits in fluid flow conduits.

BACKGROUND

The statements in this section merely provide background information related to the present disclosure and may not constitute prior art.

A semiconductor processing system generally includes a processing chamber and a plurality of fluid flow conduits through which processing gases are supplied into and removed from the processing chamber. Over time, deposits may accumulate within the fluid flow conduits. Excessive accumulation of deposits can inhibit fluid flow and cause clogs and/or system issues. To monitor deposits within a fluid flow conduit, one or more scopes or cameras may be inserted within the fluid flow conduit. However, the geometry of the fluid flow conduit and/or the geometry of the deposits may inhibit the one or more scopes/cameras from accurately detecting deposit accumulations.

These issues related to monitoring deposit accumulations within a fluid flow conduit are addressed by the present disclosure.

SUMMARY

This section provides a general summary of the disclosure and is not a comprehensive disclosure of its full scope or all of its features.

The present disclosure provides a sensor for detecting material deposits in a fluid flow conduit. The sensor includes a body and an array of pairs of temperature sensors disposed within the body, where each pair of temperature sensors is spaced a distance apart along a primary flow direction of the fluid flow conduit.

In some forms, the sensor further includes a heater secured to an exterior portion of the body.

In some forms, the sensor further includes a temperature sensor operatively engaged with the heater.

In some forms, the sensor further includes an insulation member disposed over the heater.

In some forms, the heater defines a geometry matching a geometry of the exterior portion of the body.

In some forms, the body defines an interior portion with a geometric profile matching an exterior geometry of the conduit.

In some forms, the body is a material selected from the group consisting of Aluminum Nitride (AlN) and Boron Nitride.

In some forms, the temperature sensors are selected from the group consisting of thermocouples, RTDs, thermistors, and an integrated circuit temperature transducer.

In some forms, the body defines a plurality of interior apertures, and a temperature sensor of each of the pairs of temperature sensors is disposed within an interior aperture of the plurality of interior apertures.

In some forms, at least a portion of the plurality of interior apertures is disposed at an interior portion of the body.

In some forms, the interior apertures extend longitudinally, along the primary flow direction.

In some forms, the interior apertures extend transversely, normal to the primary flow direction.

In some forms, at least some of the temperature sensors are spring-loaded within the interior apertures.

In some forms, the sensor further includes a heat sink secured to an exterior portion of the body.

In some forms, the sensor further includes a mounting device adapted to secure the body to the conduit.

In some forms, the mounting device is one of a bracket assembly and a band clamp assembly.

The present disclosure provides a method of detecting material deposits in a fluid flow conduit. The method includes detecting temperatures from an array of pairs of temperature sensors disposed proximate the fluid flow conduit, monitoring differences in temperatures of the array of pairs of temperature sensors over time, and determining a presence of material deposits based on the differences in temperature.

In some forms, the method further includes actively applying heat proximate the array of pairs of temperature sensors.

The present disclosure provides a method of detecting material deposits in a fluid flow conduit. The method includes detecting a first temperature at a first location along the fluid flow conduit and detecting a second temperature at a second location along the fluid flow conduit, where the second location is spaced a distance apart longitudinally from the first location. The method includes monitoring a temperature differential between the first temperature and the second temperature over time and determining a presence of material deposits based on the temperature differential.

In some forms, the first temperature is detected with a first two-wire heater, and the second temperature is detected with a second two-wire heater.

In some forms, the first temperature is detected with a first temperature sensor, and the second temperature is detected with a second temperature sensor.

In some forms, the method further includes applying heat proximate the first and second locations.

In some forms, the method further includes detecting additional temperatures along the fluid conduit, monitoring temperature differentials between the additional temperatures, and determining a presence of material deposits based on the additional temperature differentials.

A system for detecting material deposits in a fluid flow conduit includes a sensor for detecting material deposits in a fluid flow conduit. The sensor includes a body and an array of pairs of temperature sensors disposed within the body, where each pair of temperature sensors is spaced a distance apart along a primary flow direction of the fluid flow conduit. The system includes a mounting means for securing the sensor to the fluid flow conduit. The system includes a computing device configured to determine temperatures from the array of pairs of temperature sensors, monitor differences in thermal response of the array of pairs of temperature sensors over time, and determine a presence of material deposits based on the differences in thermal response. The system includes a clog indication means.

In some forms, the system further includes a heater disposed proximate the sensor, and a controller in communication with the heater, where the controller activates the heater to generate auxiliary heat for active detection of the material deposits.

In some forms, the computing device is configured to provide pulsed power to the array of pairs of temperature sensors, thereby generating heat for active detection of the material deposits.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2B is a side view of the passive fluid flow sensor assembly of FIG. 2A according to the present disclosure;

Figure 1A:
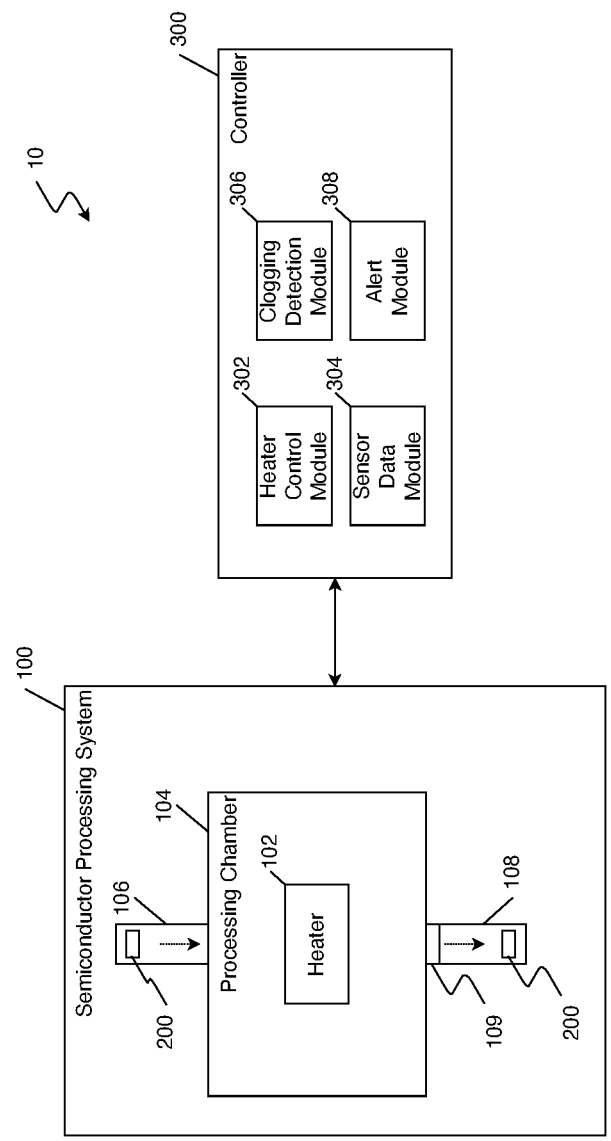
FIG. 1A is a schematic diagram of a fluid flow system according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a sensor assembly configured to determine an amount and/or location of material deposits in one or more conduits of a fluid flow system based on sensor data obtained by the sensor assembly, which may be one of an active sensor assembly or a passive sensor assembly. By determining the amount and/or location of material deposits in the one or more conduits using the sensor assemblies described herein, the fluid flow system can accurately monitor material deposits and determine whether the one or more conduits thereof are clogged.

Referring to FIG. 1A, a thermal system 10 is shown. In one form, the thermal system 10 includes a semiconductor processing system 100, which includes a heater 102, a processing chamber 104, fluid flow supply lines (FFSLs) 106, fluid flow exhaust lines (FFELs) 108, pump(s) 109, and fluid flow sensor assemblies 200. The thermal system also includes a controller 300. It should be understood that the thermal system 10 is not limited to the semiconductor processing system 100 described herein and may be implemented within various other industrial and manufacturing processes/systems, such as machining processes, injection molding processes, combustion exhaust systems, heating, ventilation, and air conditioning systems (HVAC systems), among others. As an example and in one variation, the thermal system 10 is used in an abatement system of the semiconductor processing system 100 to heat fluid flowing through a network of conduits (e.g., the FFSLs 106 and the FFELs 108).

In some forms, the heater 102 is a pedestal heater configured to heat a wafer. It should be understood, however, that the heater 102 is not limited to the examples provided herein, and includes constructions/configurations such as a layered heater, a cartridge heater, a tubular heater, a polymer heater, or a flexible heater, among other heaters having at least one resistive heating element/trace.

In one form, the heater 102 is operable to generate heat and operate as a sensor to measure a performance characteristic of the heater 102. For example, the heater 102 includes one or more resistive heating elements that operate as a sensor for measuring an average temperature of the resistive heating element based on a resistance of the resistive heating element. More particularly, such a two-wire heater is disclosed in U.S. Pat. No. 7,196,295, which is commonly owned with the present application and the contents of which are incorporated herein by reference in its entirety. In a two-wire heater system, the thermal system 10 is an adaptive thermal system that merges heater designs with controls that incorporate power, resistance, voltage, and current in a customizable feedback control system that limits one or more these parameters (i.e., power, resistance, voltage, and current) while controlling another. In one form, the controller 300 is configured to monitor at least one of current, voltage, and power delivered to the resistive heating element to determine resistance, and thus, temperature of the resistive heating element.

In one variation, the thermal system 10 includes multiple flexible heaters that wrap about the FFSLs 106 and the FFELs 108 to heat the fluid therein. In yet another example, the thermal system 10 employs cartridge heaters to directly heat fluid (e.g., gas and/or liquid) flowing through the FFSLs 106 and the FFELs 108 or provided within a container.

In some forms, the pump(s) 109 are disposed adjacent to the FFELs 108 in some forms. The pump(s) 109 is any configuration of a vacuum pump system, such as a residual gas analyzer (RGA) system. Processing fluids are supplied into the processing chamber 104 through the FFSLs 106 during various processing steps. After each processing step, the processing fluid is removed from the processing chamber 104 through the FFELs 108. Each of the FFELs 108 includes a bypass valve having two channels. The FFELs 108 is set to an open condition or a choked condition by operating the bypass valves to fluidly couple the FFELs 108 with one of the open channel and the blocked channel of the bypass valves. As used herein, the term fluid refers to a substance that flows through the thermal system 10 and a substance that is in at least one of a gas state, a liquid state, and/or a plasma state.

Figure 1B:
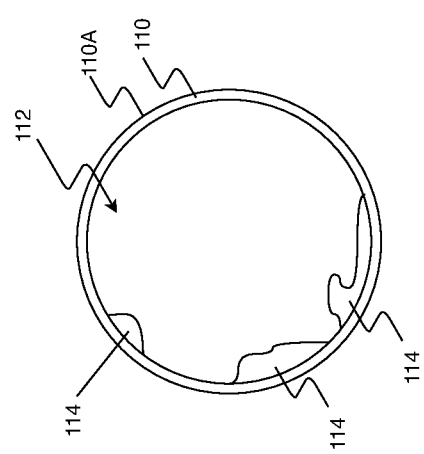
FIG. 1B is a cross-sectional view of a conduit of a fluid flow system according to the present disclosure.

Referring to FIG. 1B, a partial cross-sectional view of a conduit 110 (i.e., at least one of the FFSLs 106 and the FFELs 108) with a cavity 112 therein is shown. Over time, material deposits 114 may form within the conduit 110. While the material deposits 114 are illustrated as having a non-uniform shape along the conduit 110, it should be understood that the material deposits 114 may have various geometries in other forms. As described below in further detail, one or more fluid flow sensor assemblies are configured to detect the presence and extent of these material deposits 114.

Referring to FIGS. 1A-1B, the fluid flow sensor assemblies 200 are configured to generate data indicating an amount of material deposits 114 within the conduit 110. The fluid flow sensor assemblies 200 in one form are disposed on an outer surface 110A, or at least partially disposed within the cavity 112 in other forms. The fluid flow sensor assemblies 200 are implemented as a passive sensor assembly or an active sensor assembly, as described below in further detail.

The controller 300 includes a heater control module 302, a sensor data module 304, a buildup detection module 306, and an alert module 308. In order to perform the functionality described herein, the controller 300 is implemented by a microcontroller that includes one or more processor circuits configured to execute machine-readable instructions stored in one or more nontransitory computer-readable mediums, such as a random-access memory (RAM) circuit and/or a read-only memory (ROM) circuit. While the heater control module 302, the sensor data module 304, the buildup detection module 306, and the alert module 308 are illustrated as part of the controller 300, it should be understood that any one of these modules may be located on separate controller(s) communicatively coupled to the controller 300.

The heater control module 302 is configured to control a thermal profile of the heater 102 and/or a heater of the fluid flow sensor assembly 200, which may vary based on different controls. For example, the controls include, but are not limited to, monitoring power provided to the heater 102 and/or the heater of the fluid flow sensor assembly 200, an operational mode of the thermal system 10 (e.g., a manual mode to control power to the heater 102 based on inputs from a user, a cold-start mode to gradually increase temperature of the heater 102, a steady-state mode to maintain the heater 102 at a temperature setpoint, among other defined operation modes for controlling the heater 102), and/or operational state of different zones of the heater 102 when the heater 102 is a multi-zone heater, among others. Furthermore, the controls include, but are not limited to, the type of wafer being heated, gases being injected into the process chamber 104 having the heater 102, and/or a pressure differential within the process chamber 104 for securing the wafer to the heater 102, among others.

The sensor data module 304 is configured to obtain sensor data from the fluid flow sensor assemblies 200, such as heat flux data and temperature differential data. As used herein, "heat flux data" refers to heat flux data generated by the fluid flow sensor assemblies 200. As used herein, "temperature differential data" refers to a temperature difference, as indicated by the fluid flow sensor assemblies 200, between at least two spaced apart locations of a respective FFSL 106 and/or FFEL 108 or a temperature difference at a same location of a respective FFSL 106 and/or FFEL 108 taken at different times.

The buildup detection module 306 of the controller 300 is configured to determine whether the FFSLs 106 and/or the FFELs 108 are at least partially blocked by the material deposits 114 based on the operational data, as described below in further detail with reference to FIGS. 8-9. The alert module 308 is configured to generate an alert in response to determining the FFSLs 106 and/or the FFELs 108 are clogged (e.g., the amount of material deposits 114 exceeds a threshold value), as described below in further detail with reference to FIGS. 8-9.

Figure 2A:
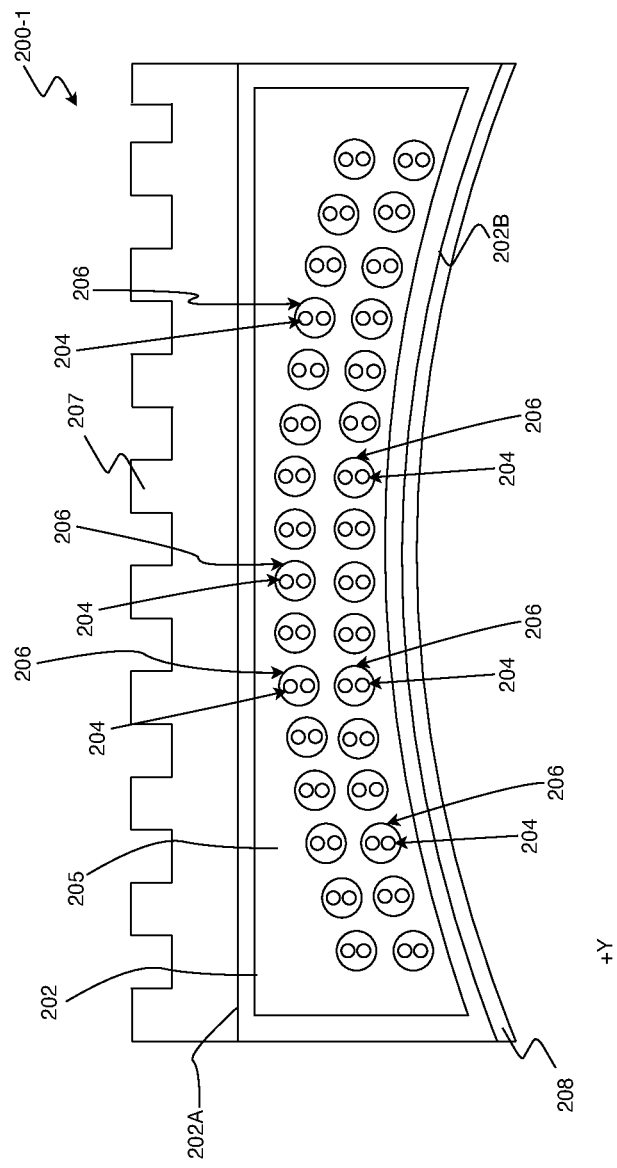
FIG. 2A is a front view of a passive fluid flow sensor assembly according to the present disclosure.
Figure 2C:
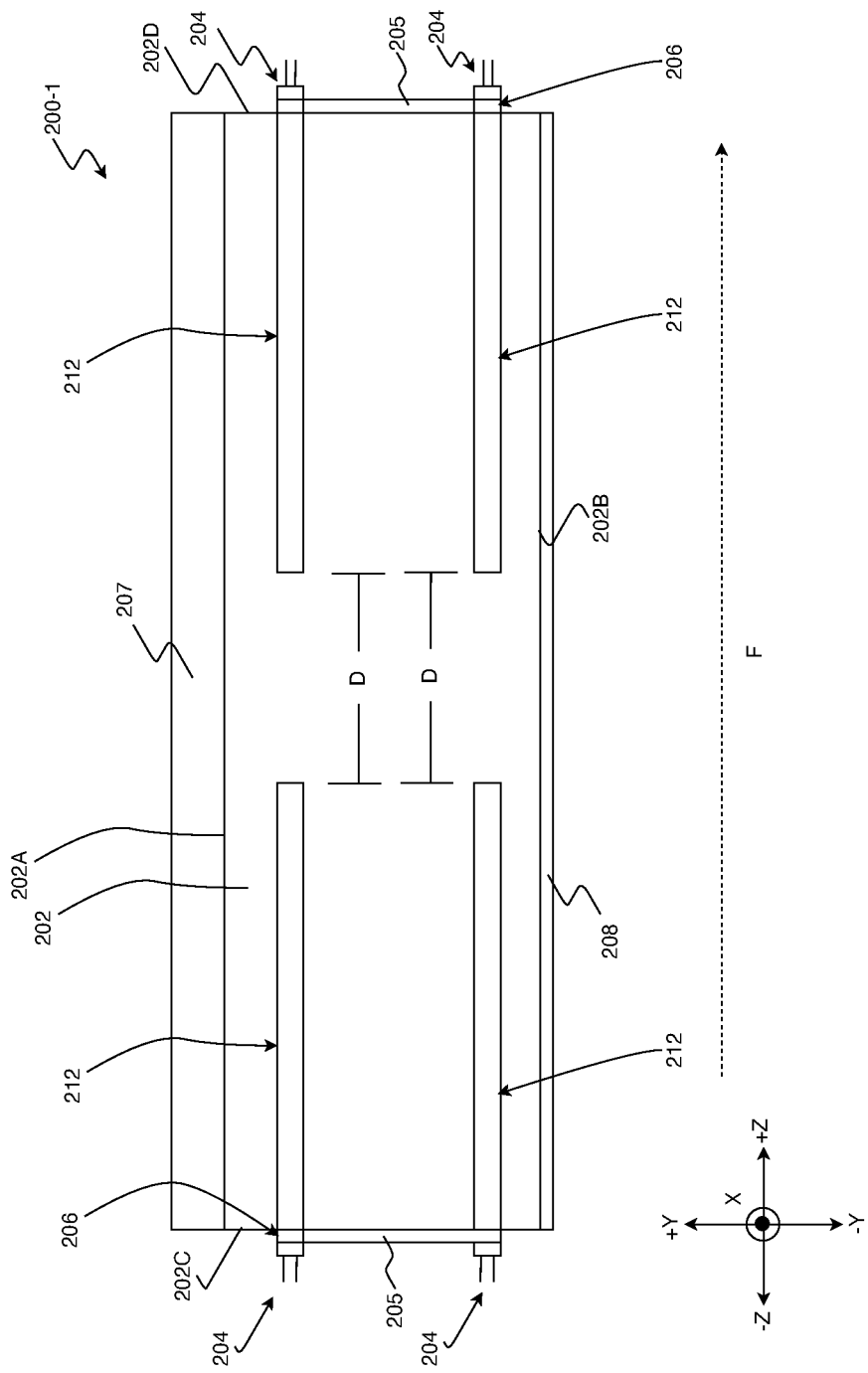
FIG. 2C is a cross-sectional view of the passive fluid flow sensor assembly of FIG. 2A according to the present disclosure.

With reference to FIGS. 2A-2C, one form of a passive fluid flow sensor assembly according to the present disclosure is illustrated and generally indicated by reference numeral 200-1. The passive fluid flow sensor assembly 200-1 includes a body 202, a plurality of thermocouples 204, one or more gussets 205, gusset apertures 206, a heat sink 207, and an optional thermal interface material 208. As shown in FIG. 2C, the body 202 of the passive fluid flow sensor assembly 200-1 also includes interior apertures 212.

In some forms, at least some of the components of the passive fluid flow sensor assembly 200-1 are bonded and/or fixed to each other using various processes and/or materials, such as a soldering process, a brazing process, an adhesive (e.g., a silicone elastomer, a room-temperature-vulcanizing (RTV) silicone, epoxy, among others), or any other suitable process/material. As an example, the heat sink 207 is bonded to an upper surface 202A of the body 202 using an adhesive. Likewise, the thermal interface material 208 is bonded to a lower surface 202B of the body 202 using an adhesive, or in another form, the thermal interface material 208 is bonded itself to the lower surface 202B. In another form, the heat sink 207 is fastened to the body 202 using bolts, rivets, and/or other similar fastening devices. Further, the gussets 205 in one form are bonded to edge surfaces 202C, 202D of the body 202.

The passive fluid flow sensor assembly 200-1 is communicatively and electrically coupled to the controller 300. As an example, the passive fluid flow sensor assembly 200-1 is communicatively coupled to the controller 300 via a hardwire link (i.e., the lead wires (not shown) to the plurality of thermocouples 204) or a wireless link, such as a Bluetooth link (e.g., a Bluetooth low energy link), a wireless fidelity (Wi-Fi) link, a near field communication (NFC) link, among others.

The body 202 includes the upper surface 202A and the lower surface 202B. In one form, the upper surface 202A of the body 202 has a geometry to accommodate the geometry of the heat sink 207. In the example illustrated, the upper surface 202A is planar. However, it should be understood that the upper surface 202A may be arcuate or any other suitable shape corresponding to the geometry of the heat sink 207. Similarly, the lower surface 202B of the body 202 has a geometry to accommodate the geometry of the conduit 110. As an example, the lower surface 202B of the body 202 has a curved surface that matches a curved surface of the conduit 110. The body 202 in one form is made of a thermally conductive material, such as copper, nickel, silver, aluminum, lithium, platinum, tin, and alloys thereof, among others. In another form, the body 202 is made of a ceramic material, such as by way of example, aluminum nitride, boron nitride, a glass-based ceramic (e.g., borosilicate glass), among others.

In one form, the plurality of thermocouples 204 are surrounded by insulation material. The thermocouples 204 and the insulation material extend through the gusset apertures 206 and into respective interior apertures 212 of the body 202. The plurality of thermocouples 204 extend in a direction that is generally perpendicular to a direction in which the passive fluid flow sensor assembly 200-1 obtains heat flux measurements (i.e., in the ±Z direction). As shown, the plurality of thermocouples 204 are arranged in an array of pairs within the body 202. As used herein, the term "array" should be construed to mean an ordered series or arrangement of a plurality of discrete thermocouple locations, such as the two rows of thermocouples 204, one with seventeen (17) thermocouples 204 in the top row and sixteen (16) thermocouples 204 in the bottom row. However, multiple rows and columns, or other geometric distributions, of thermocouples 204 other than those illustrated herein can be employed while remaining within the scope of the present disclosure. Furthermore, in one form, the plurality of thermocouples 204 are electrically coupled in series or in parallel such that they collectively form a thermopile, or a set of thermocouples arranged to measure heat flux as described herein.

As shown in FIG. 2C, the plurality of thermocouples 204 are separated by distance (D) along a primary flow direction (i.e., in the ±Z direction), indicated by arrow "F" of the conduit 110. Two thermocouples 204 separated by the distance "D" define a "pair" of the array of pairs of thermocouples. When the interior apertures 212 are blind, these interior apertures 212 are also spaced by approximately distance (D). In another form, the plurality of interior apertures 212 extend through the entire length of the body 202. The interior apertures 212 in one form extend longitudinally along the primary flow direction as shown (i.e., in the ±Z direction). However, in another form, the interior apertures 212 could extend transversely (i.e., in the ±Y direction), or normal (i.e., in the ±X direction), to the primary flow direction, or could be oriented at any angle while remaining within the scope of the present disclosure. In one variation, at least one of the plurality of interior apertures 212 is formed such that interior aperture 212 is in communication with the thermal interface material 208. As such, at least one of the plurality of thermocouples 204 is in more direct contact with the conduit 110 when the passive fluid flow sensor assembly 200-1 is coupled to the conduit 110, as described below in further detail.

The plurality of thermocouples 204 are configured to measure a heat flux at a junction point of the thermocouples 204. More specifically, the output from the junction is a voltage signal having a magnitude that is directly proportional to the heat flux. As described below in further detail, the controller 300 determines the heat flux at the junction by referencing a lookup table of the controller 300 that correlates measured voltage values to particular heat flux values.

The gusset 205 is configured to provide additional structural support, and also to act as a strain relief, for the plurality of thermocouples 204. The gusset 205 is made of a material configured to electrically isolate the plurality of thermocouples 204 from the body 202. The gusset 205, however, is optional and the passive fluid flow sensor assembly 200-1 can be operated without the gusset 205.

The heat sink 207 transfers the heat generated by the passive fluid flow sensor assembly 200-1 and/or the conduit 110 to an outside environment. Accordingly, heat generated by the passive fluid flow sensor assembly 200-1 and/or the conduit 110 is dissipated away from the passive fluid flow sensor assembly 200-1. The optional thermal interface material 208 is generally any thermally conductive material, such as copper, nickel, silver, aluminum, lithium, platinum, tin, silicone, and combinations thereof, among others. In some forms, mounting elements are provided such that the passive fluid flow sensor assembly 200-1 is mounted to the conduit 110 using a mounting device, as described below in further detail with reference to FIGS. 7A-7D.

Figure 3A:
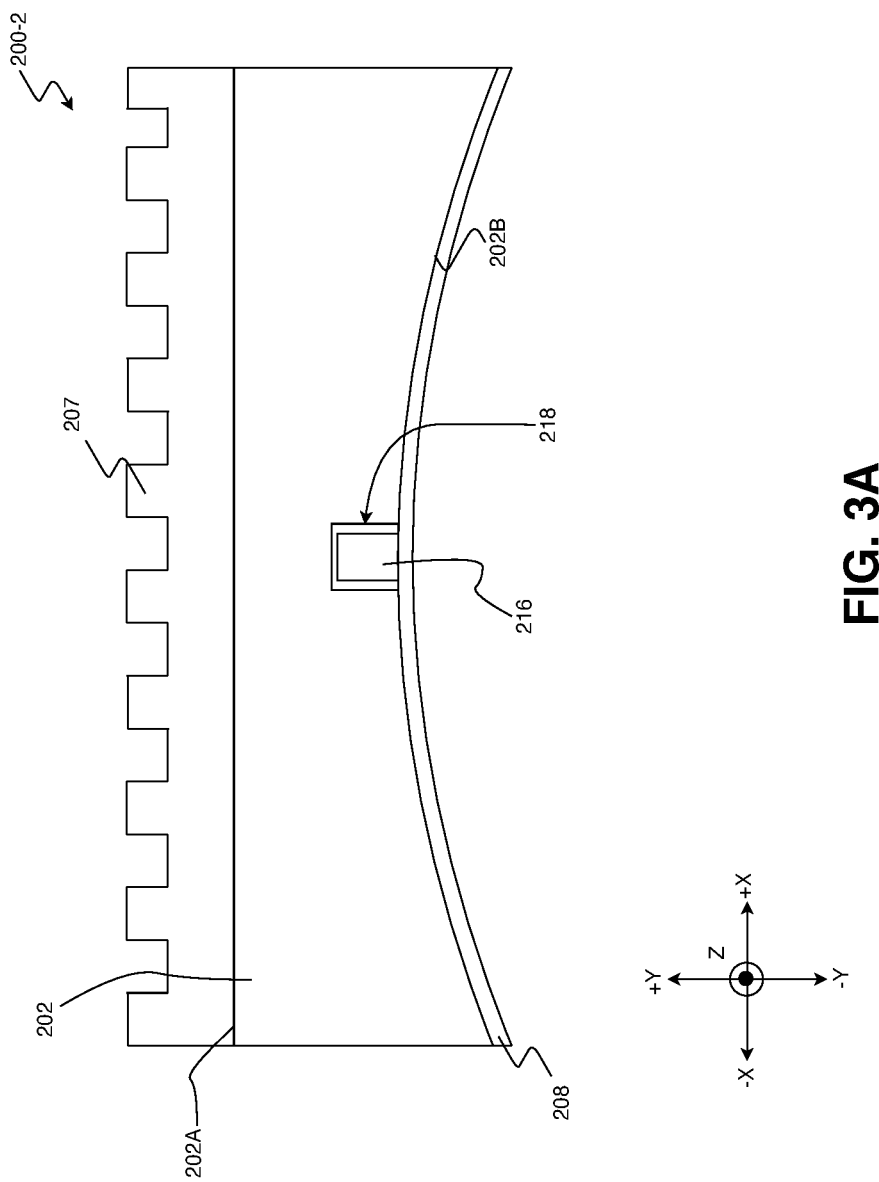
FIG. 3A is a front view of an active fluid flow sensor assembly according to the present disclosure.
Figure 3B:
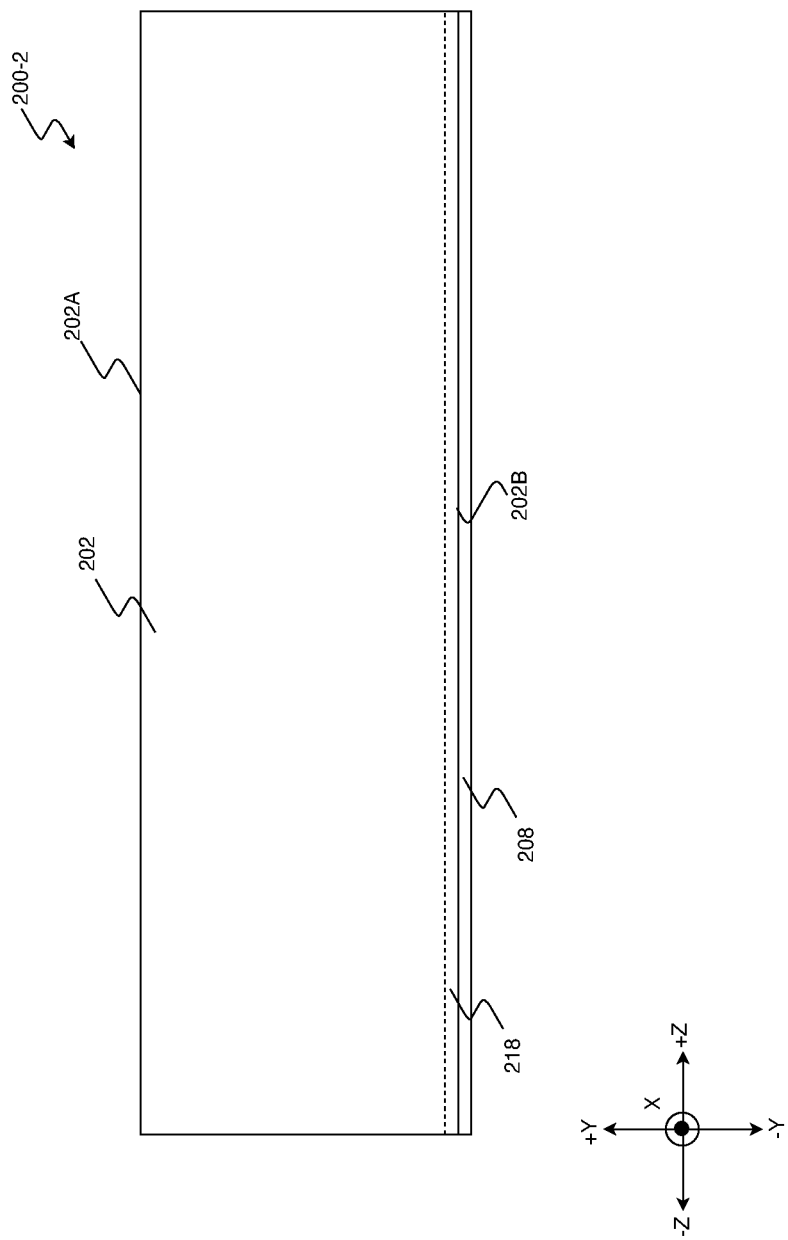
FIG. 3B is a side view of the active fluid flow sensor assembly of FIG. 3A according to the present disclosure.

With reference to FIGS. 3A-3B, front and side views of another form of a passive fluid flow sensor assembly constructed according to the present disclosure is illustrated and generally indicated by reference numeral 200-2. Passive fluid flow sensor assembly 200-2 is similar to passive fluid flow sensor assembly 200-1 described above with reference to FIGS. 2A-2C, but in this variation, the passive fluid flow sensor assembly 200-2 includes a temperature sensing device 216 instead of the array of thermocouples 204, and the passive fluid flow sensor assembly 200-2 includes a single aperture 218 for mounting the temperature sensing device 216 instead of the plurality of interior apertures 212. The temperature sensing device 216 is disposed within the aperture 218 of the body 202, and the temperature sensing device 216 is positioned proximate and/or adjacent to the conduit 110, or the thermal interface material 208 if this optional material is employed. In one form, the temperature sensing device 216 extends along a length of the body 202 and in a direction that is perpendicular to a direction in which the passive fluid flow sensor assembly 200-2 obtains temperature measurements. The temperature sensing device 216 is implemented by any device configured to obtain temperature measurements, such as a resistance temperature detector, a thermistor, a resistor, an integrated circuit temperature transducer, or a heat flux sensor, among others.

While the above forms illustrate the fluid flow sensor assembly 200 as the passive fluid flow sensor assembly 200-1, 200-2 (i.e., the fluid flow sensor assembly does not include a heater integrated therein), in another form, the fluid flow sensor assembly 200 is implemented as an active fluid flow sensor assembly with a heater integrated therein or cooperating with the sensing means, as described below in further detail. Therefore, an "active" fluid flow sensor assembly is one in which heat is actively applied in order to sense differences in temperatures with differing amounts of material deposits 114.

Figure 4A:
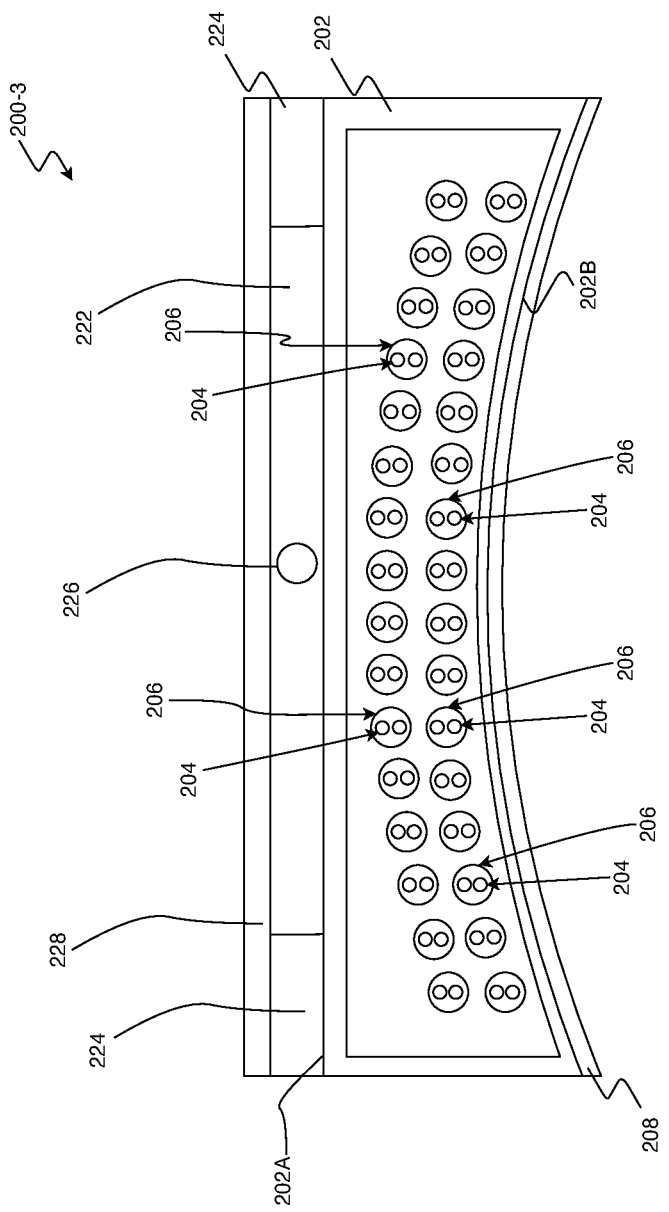
FIG. 4A is a front view of another form of an active fluid flow sensor assembly according to the present disclosure.
Figure 4B:
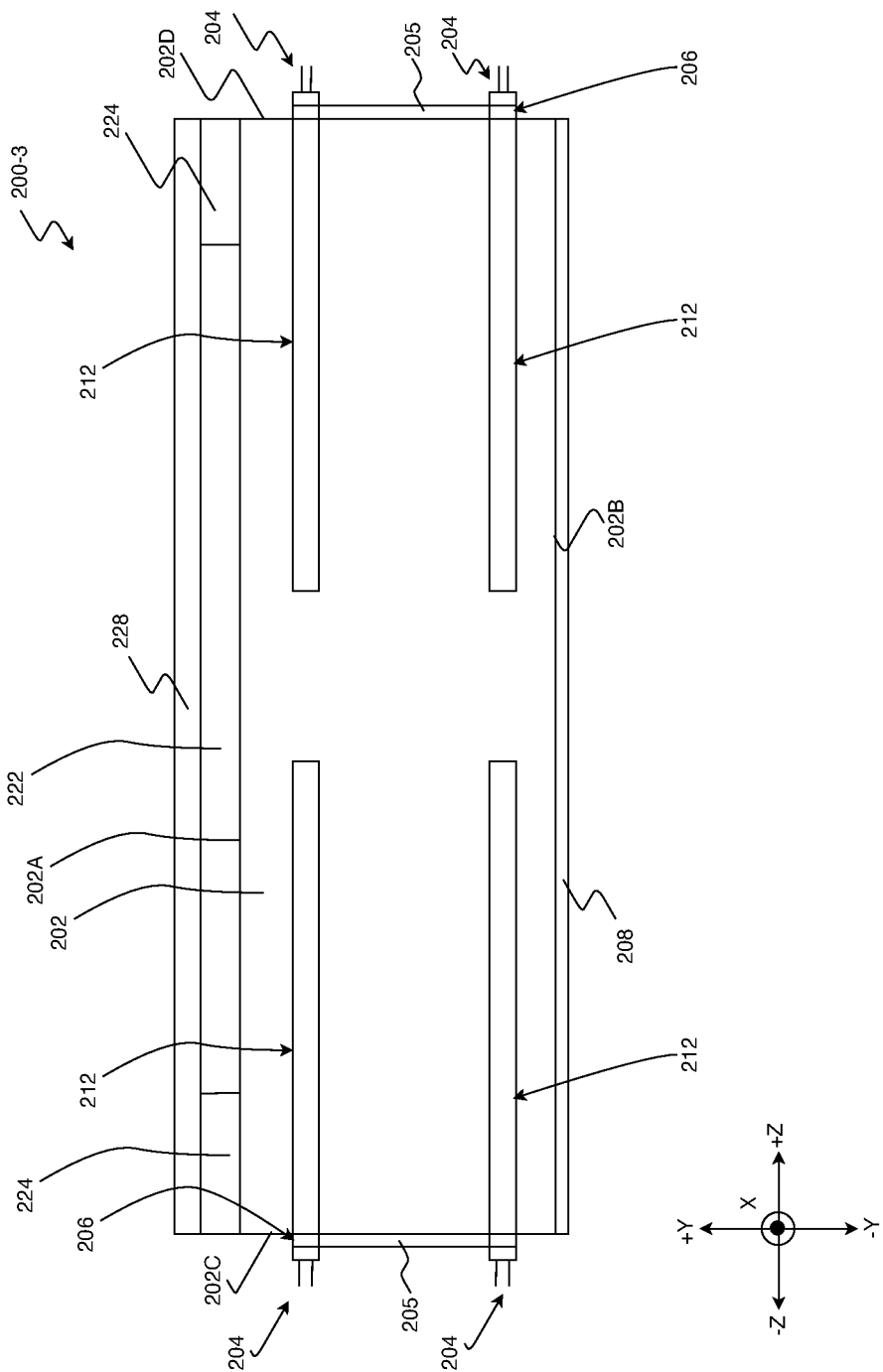
FIG. 4B is a cross-sectional view of the active fluid flow sensor assembly of FIG. 4A according to the present disclosure.

With reference to FIGS. 4A-4B, one form of an active fluid flow sensor assembly according to the present disclosure is illustrated and indicated by reference numeral 200-3. The active fluid flow sensor assembly 200-3 includes the body 202, the plurality of thermocouples 204, the one or more optional gussets 205 having gusset apertures 206, the optional thermal interface material 208, and the interior apertures 212. Furthermore, the active fluid flow sensor assembly 200-3 includes a heater 222, mounting portions 224, electrical leads 226 (FIG. 4A), and an insulation member 228. While the active fluid flow sensor assembly 200-3 is illustrated as having the plurality of thermocouples 204, it should be understood that the plurality of thermocouples 204 may be replaced or supplemented with the single/discrete temperature sensing device 216 as described above while remaining within the scope of the present disclosure.

In some forms, at least some of the components of the active fluid flow sensor assembly 200-3 are bonded and/or fixed to each other using various processes and/or materials, such as a soldering process, a brazing process, an adhesive (e.g., a silicone elastomer, an RTV silicone, epoxy, among others), or any other suitable process/material. As an example, the heater 222 is secured, via the mounting portions 224, to an upper surface 202A of the body 202 using bolts, rivets, and/or other similar fastening materials. As another example, the insulation member 228 is bonded to the heater 222 using an adhesive.

The heater 222 is disposed on the upper surface 202A of the body 202, and as such, has a geometry to accommodate the geometry of the upper surface 202A of the body 202. The heater 222 in one form is a ceramic heater, but may be of any type of construction including those described above in connection with the heater 102. Accordingly, the heater 222 is selectively activated to emit heat to obtain temperature data and/or heat flux data, thereby enabling active sensing.

The insulation member 228 is any thermally insulative material configured that reduces heat losses from the heater 222 and to direct the heat emitted by the heater 222 towards the body 202 and the underlying conduit 110. As an example, the insulation member 228 includes polyimide fiber, organic fiber, mineral fiber, foam (e.g., a silicon rubber sponge), and aerogel, among others.

Figure 5:
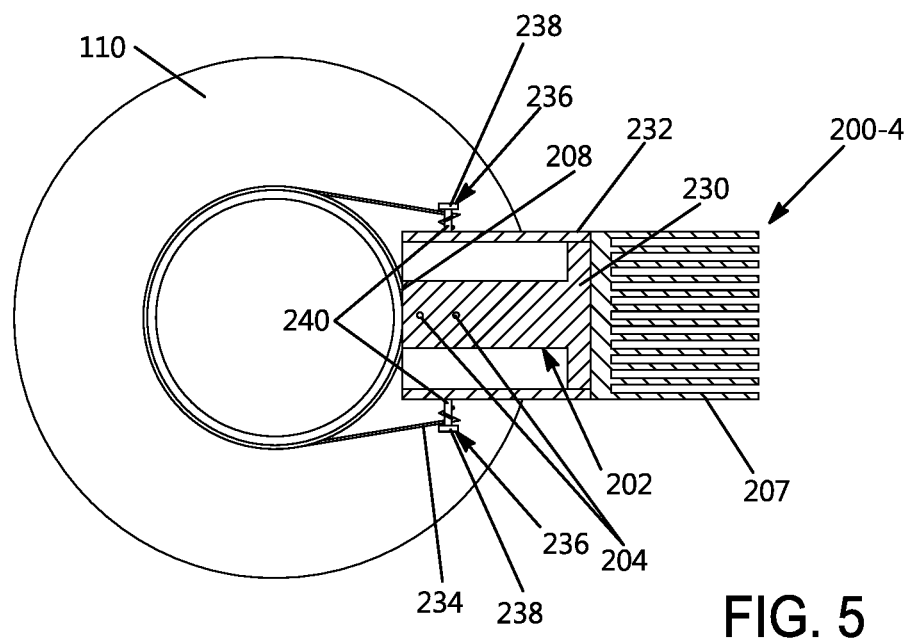
FIG. 5 is a perspective view of a passive fluid flow sensor assembly secured around a conduit of a fluid flow system according to the present disclosure.

With reference to FIG. 5, another form of a passive fluid flow sensor assembly is illustrated and generally indicated by reference numeral 200-4. In one form, the passive fluid flow sensor assembly 200-4 is at least partially disposed within the conduit 110 as shown. While the passive fluid flow sensor assembly 200-4 is illustrated as at least partially disposed within the insulation layer 114 of the conduit 110, it should be understood that any one of the passive fluid flow sensor assemblies and/or any one of the active fluid flow sensor assemblies described herein may be partially disposed within the conduit 110. In one form, the passive fluid flow sensor assembly 200-4 includes the body 202, the plurality of thermocouples 204, the heat sink 207, the thermal interface material 208, a thermal diffuser 220, a protective sleeve 232, an attachment wire/strap 234, and attachment elements 236. While not shown in FIG. 5, it should be understood that the passive fluid flow sensor assembly 200-4 also includes the inner apertures 212.

The protective sleeve 232 surrounds the body 202 and is made of a material configured to mechanically protect and thermally and/or electrically insulate the body 202 from the conduit 110. In some forms, the protective sleeve 232 can surround the body 202 such that an air gap separates the body 202 and the insulative sleeve 232. In one variation, the protective sleeve 232 is bonded to the body 202 using an adhesive material.

The passive fluid flow sensor assembly 200-4 is attached to the conduit 110 via the attachment wire 234 and the attachment elements 236. In some forms, the attachment wire 234 is a steel wire or other similar type of wire embedded within the conduit 110 and wrapped around the attachment elements 236. In some forms, the attachment elements 236 are pins having a collar portion 238 and an elongated portion 240. In some forms, the attachment wire 234 is wrapped around elongated portion 240, and the attachment wire 224 is securely fastened via the collar portion 238.

Figure 6:
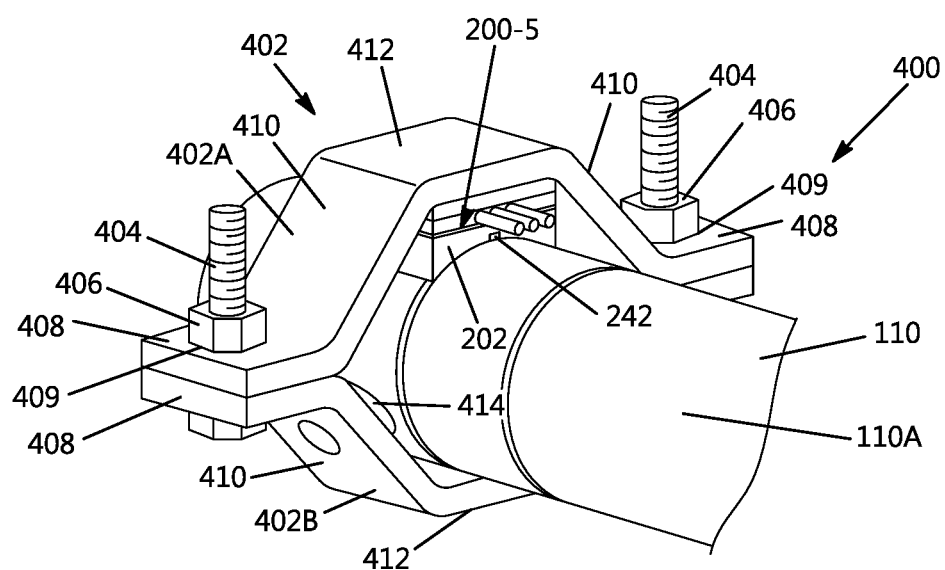
FIG. 6 is a perspective view of an active fluid flow sensor assembly secured to a conduit of a fluid flow system according to the present disclosure.

With reference to FIG. 6, one form of a mounting device for either a passive or active fluid flow sensor assembly is a bracket assembly 400. While the active fluid flow sensor assembly 200-5 is illustrated as secured to the conduit 110 via the bracket assembly 400, it should be understood that any one of the passive fluid flow sensor assemblies and/or any one of the active fluid flow sensor assemblies described herein may be secured to the conduit 110 via the bracket assembly 400.

The active fluid flow sensor assembly 200-5 is similar to the active fluid flow sensor assembly 200-3 described above, but in this form, the active fluid sensor assembly 200-5 includes a slot 242 extending along the length of body 202 and in communication with the thermal interface material 208. Accordingly, the plurality of thermocouples 204 or the temperatures sensing device 216 may be disposed within the slot 242 to obtain the temperature data.

In one form, the bracket assembly 400 includes an upper bracket 402A and a lower bracket 402B (collectively referred to as brackets 402), a fastening element 404, and a securing element 406. Each of the brackets 402 includes fastening portions 408, engagement apertures 409, connecting portions 410, and an interface portion 412. In some forms, at least one of the brackets 402 includes a thermal isolation element 414. The brackets 402 is implemented by at least one of a steel material, a composite material (e.g., a carbon-fiber reinforced polymer), a combination thereof, among others.

In one form, the fastening element 404 is a bolt, and the securing element 406 is a nut as shown. Accordingly, the nut is threadably coupled to the bolt, thereby compressively securing the brackets 402 to the active fluid flow sensor assembly 200-5 and the conduit 110. By securing the brackets 402 to the active fluid flow sensor assembly 200-5, the conduit 110 and the fluid flow sensor assembly 200-5 are thermally coupled.

The connecting portions 410 are disposed between the fastening portions 408 and the interface portions 412 and can have any geometry to accommodate the geometry of the conduit 110. The interface portions 412 are configured to securely fix the active fluid flow sensor assembly 200-5 and the conduit 110 to the brackets 402 when the fastening element 404 and the securing element 406 are threadably engaged. The thermal isolation element 414, which includes an insulating plastic material, is configured to thermally insulate the bracket 402B from the conduit 110.

Figure 7A:
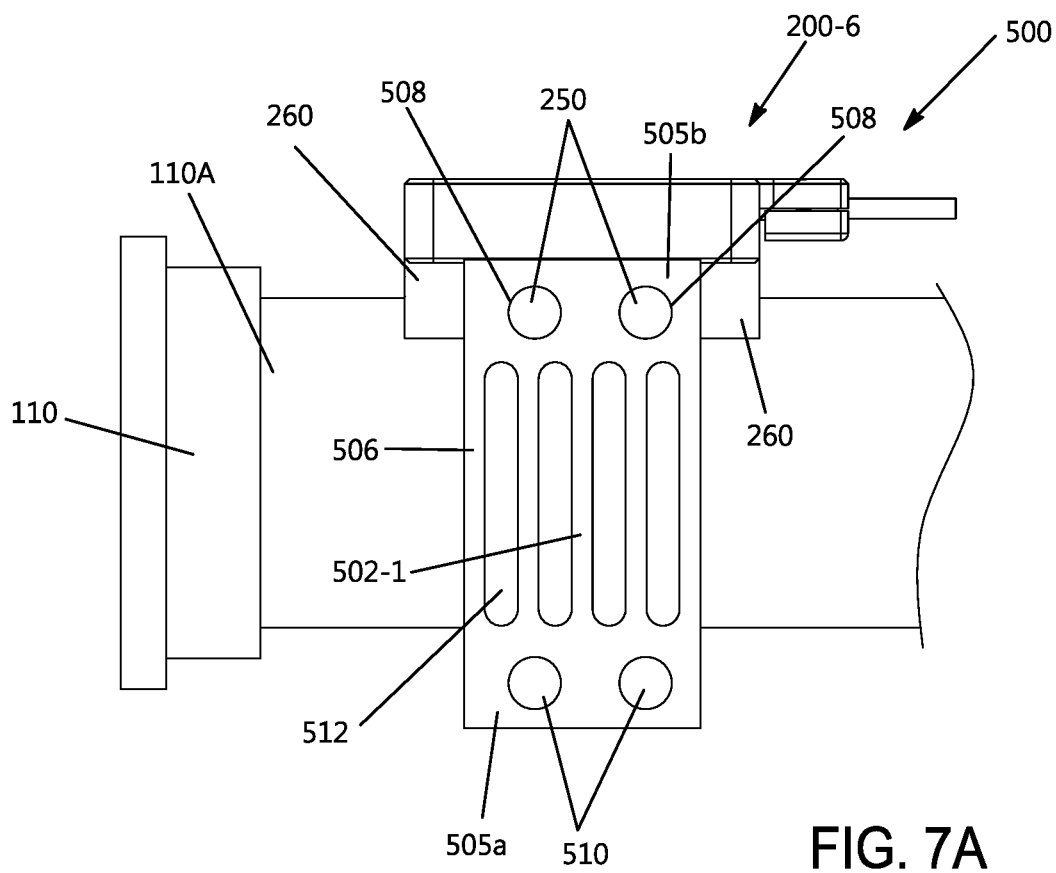
FIG. 7A is a side view of another form of an active fluid flow sensor assembly secured to a conduit of a fluid flow system according to the present disclosure.
Figure 7B:
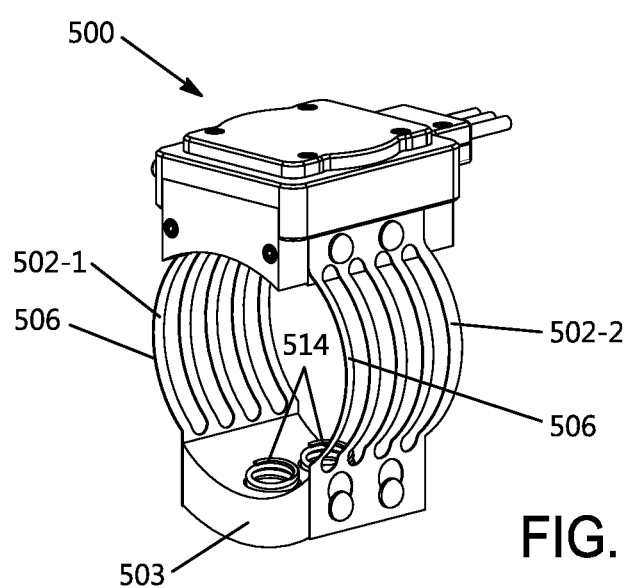
FIG. 7B is a perspective view of a band clamp assembly according to the present disclosure.
Figure 7C:
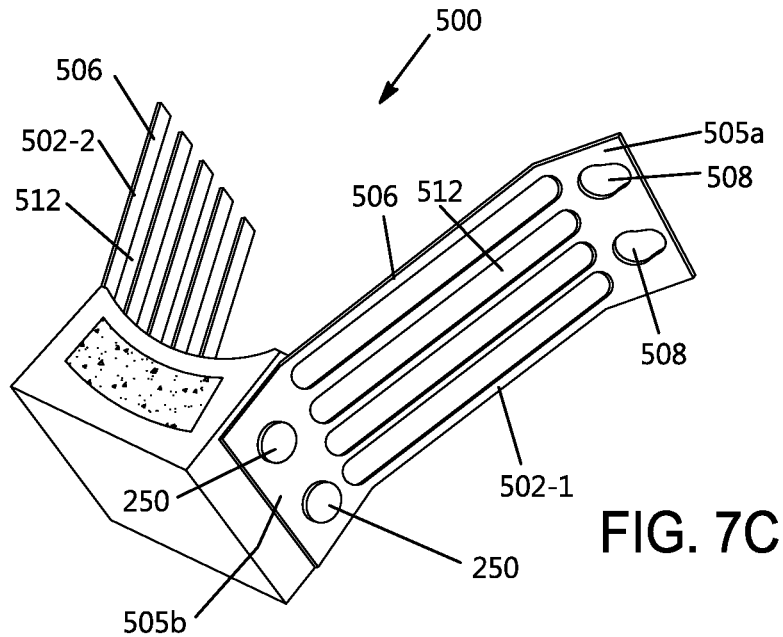
FIG. 7C is a perspective view of another band clamp assembly according to the present disclosure.

With reference to FIG. 7A, a perspective view of an active fluid flow sensor assembly 200-6 securely fastened to an outer surface 110A of the conduit 110 via band clamp assembly 500 is shown. The active fluid flow sensor assembly 200-6 is similar to the active fluid flow sensor assemblies 200-3, 200-5, but in the form, the active fluid flow sensor assembly 200-6 includes mounting elements 250 and lower housing 260. While the active fluid flow sensor assembly 200-6 is illustrated as securely fastened to the conduit 110 via the band clamp assembly 500, it should be understood that any one of the passive fluid flow sensor assemblies 200-1, 200-2, 200-4 and/or any one of the active fluid flow sensor assemblies 200-3, 200-5 described herein can be securely fastened to the conduit 110 via the band clamp assembly 500.

Figure 7D:
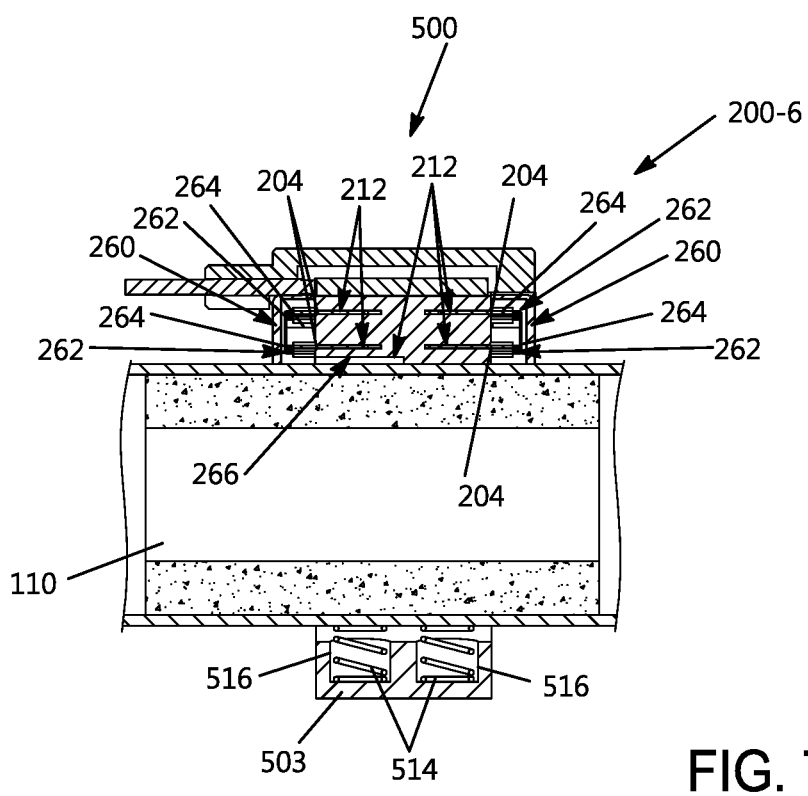
FIG. 7D is a cross-sectional view of an active fluid flow sensor assembly secured to a conduit of a fluid flow system according to the present disclosure.

With reference to FIG. 7D, the lower housing 260 includes one or more recesses 262 to accommodate the plurality of thermocouples 204. In one form, a reference thermocouple 266 is disposed within one of the interior apertures 212. The reference thermocouple 266 is disposed proximate and/or adjacent to the conduit 110 as shown (e.g., proximate to the lower surface 202B of the body 202 and/or the optional thermal interface material 208) to obtain local temperature measurements at its discrete location relative to the conduit 110. These discrete temperature measurements are compared with the temperature data/measurements from the array of thermocouples 204 as a reference/check on the fidelity/accuracy of the temperature data from the array of thermocouples 204. The discrete temperature measurements from the reference thermocouple 266 may also be used for calibration purposes or as a back-up if the array of thermocouples 204 is not functioning properly.

Referring to FIGS. 7A-7D, the band clamp assembly 500 includes a first flexible mounting element 502-1, a second flexible mounting element 502-2, and an interconnecting member 503 that cooperate to define a partially enclosed opening that the conduit 110 extends through. Each of the mounting elements 502-1, 502-2 are positioned on opposing sides of the conduit 110. Each of the mounting elements 502-1, 502-2 includes opposing attachment ends 505a, 505b and a plurality of tabs 506 spaced apart from each other and extending between the opposing attachment ends 505a, 505b. Each of the attachment ends 505a, 505b includes apertures 508 formed therein. When each of the mounting elements 502-1, 502-2 are positioned on opposing sides of the conduit 110, fastening elements 510 extend through respective apertures 508 of the attachment end 505a and at least partially through the interconnecting member 503, and mounting elements 250 extend through respective apertures 508 of the attachment end 505b and at least partially through the lower housing 260 of the sensor assembly 200-6. In this way, the mounting elements 502-1, 502-2 are secured to the sensor assembly 200-6 and the interconnecting member 503, and the sensor assembly 200-6 is secured to the conduit 110.

The tabs 506, which each have a width that is approximately equal to the active fluid flow sensor assembly 200-6, are disposed on the outer surface 110A of the conduit 110. In some forms, apertures 512 (e.g., slots, perforations, among others) between the tabs 506 inhibit heat transfer to and from the active fluid flow sensor assembly 200-6. In one variation, the band clamp assembly 500 includes one or more thermally insulative spacers disposed between the tabs 506 and the active fluid flow sensor assembly 200-6 to further inhibit heat transfer to and from the active fluid flow sensor assembly 200-6. The interconnecting member 503 has an upper surface that corresponds to the shape of the conduit 110. Biasing members 514 (e.g., compression springs) are disposed in respective grooves 516 of the interconnecting member 503 and are configured to bias the conduit 110 toward the sensor assembly 200-6 when the sensor assembly 200-6 is secured to the conduit 110 and the band clamp assembly 500. Stated differently, when the conduit 110 is positioned within the partially enclosed opening defined by the first flexible mounting element 502-1, the second flexible mounting element 502-2, and the interconnecting member 503, the conduit 110 compresses the biasing members 514. Once the sensor assembly 200-6 is secured to the band clamp assembly 500 and the conduit 110 as described above, the biasing members 514 bias the conduit 110 upwardly toward the sensor assembly 200-6.

Figure 8A:
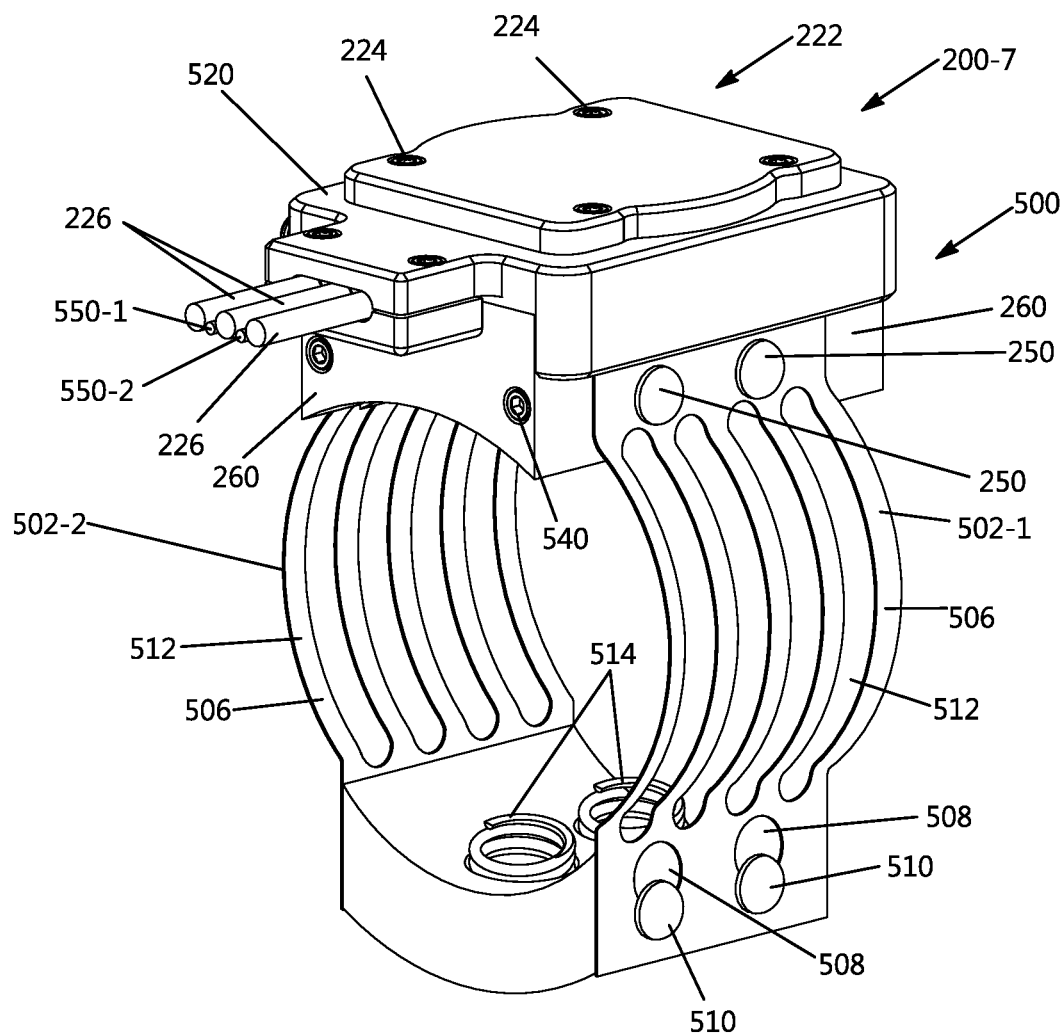
FIG. 8A is a perspective view of another form of an active fluid flow sensor assembly according to the present disclosure.
Figure 8B:
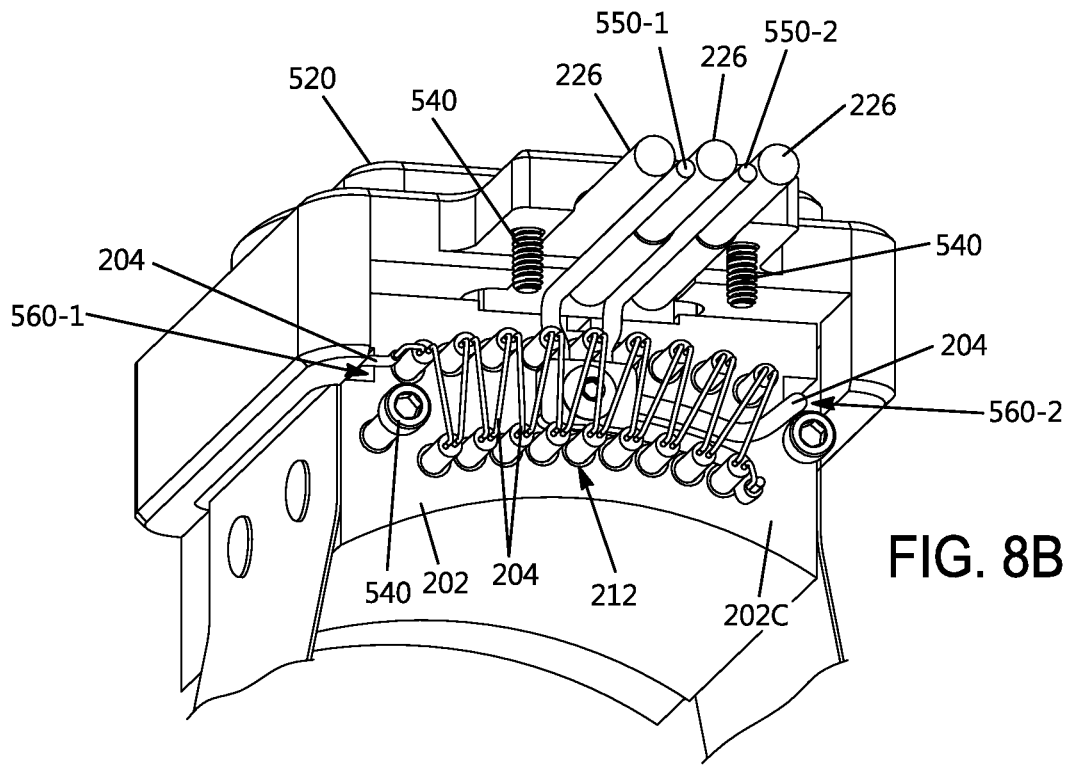
FIG. 8B is a front view of the active fluid flow sensor assembly of FIG. 8A according to the present disclosure with a lower housing of the sensor assembly removed for clarity.
Figure 8C:
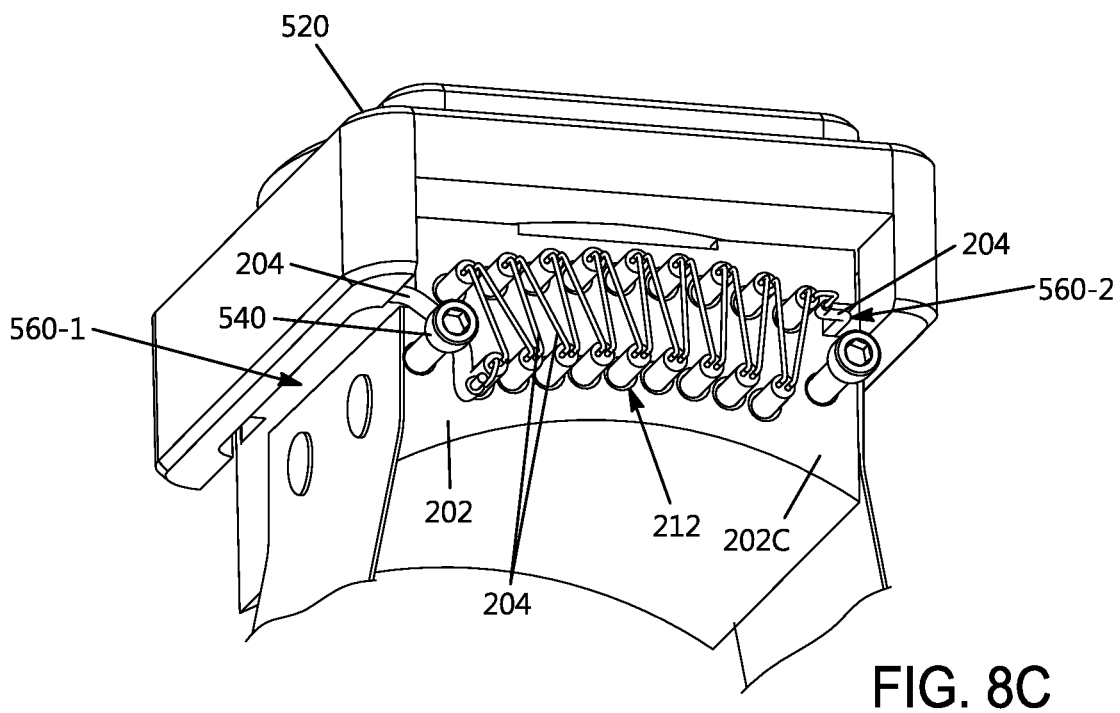
FIG. 8C is a back view of the active fluid flow sensor assembly of FIG. 8A according to the present disclosure with the lower housing of the sensor assembly removed for clarity.
Figure 8D:
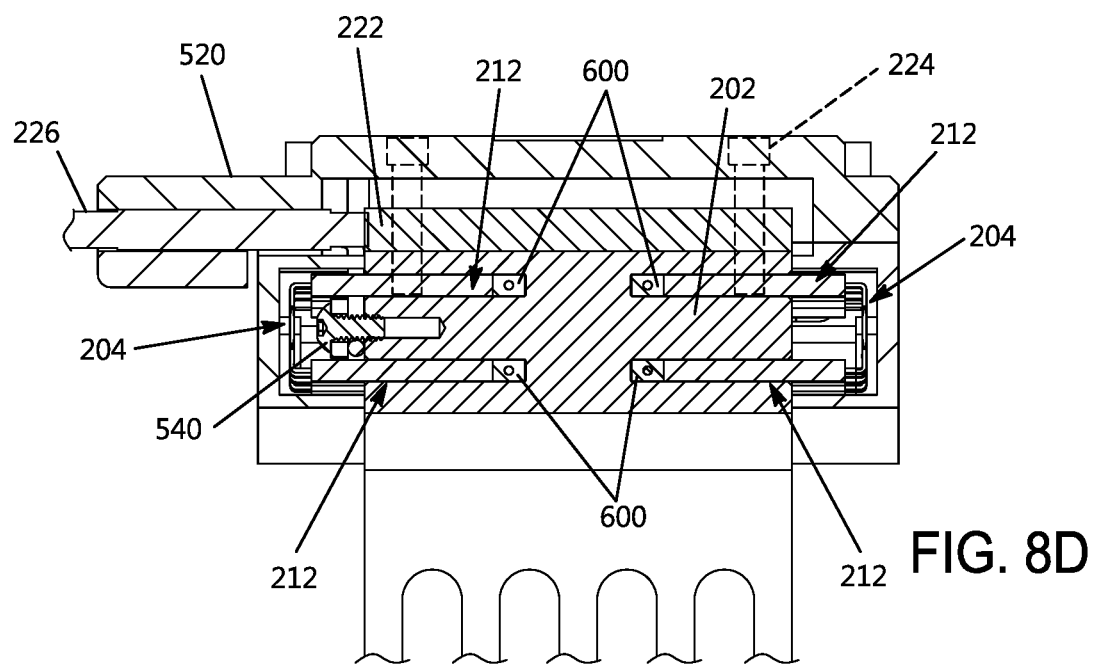
FIG. 8D is a cross-sectional view of the active fluid flow sensor assembly of FIG. 8A according to the present disclosure.

With reference to FIGS. 8A-8D, the band clamp assembly 500 and one form of an active fluid flow sensor assembly according to the present disclosure are illustrated, and the active fluid flow sensor assembly is indicated by reference numeral 200-7. The active fluid flow sensor assembly 200-7 includes the heater 222, the mounting portions 224, the electrical leads 226, an insulation member (not shown), an upper housing 520, and fastening elements 540. As illustrated in FIGS. 8B-8C, which illustrate the active fluid flow sensor assembly 200-7 without the lower housing 260, the active fluid flow sensor assembly 200-7 includes a first thermocouple power lead 550-1 and second thermocouple power lead 550-2 that collectively form thermocouple power leads 550, and a first recess 560-1 and a second recess 560-2 both formed in opposing sides of the body 202.

The upper housing 520 and the lower housing 260 encase the body 202 and the heater 222. The upper housing 520, the lower housing 260, and the active fluid flow sensor assembly 200-7 are securely fastened to each other using the fastening elements 540, which in this form is a screw. In one form, the thermocouple power leads 550 communicably couple the controller 300 and the plurality of thermocouples 204, thereby enabling the controller 300 to measure heat flux between junctions 600 (shown in FIG. 8D) and determine a corresponding heat flux value.

In one form, the plurality of thermocouples 204 are electrically connected in series, as shown in FIGS. 8B-8C. Furthermore, at least a portion of the plurality of thermocouples 204 are disposed within the recesses 560-1, 560-2 to form an electrical series connection between the plurality of thermocouples 204 disposed on both of the edge surfaces 202C, 202D of the body 202. In one form, the portions of the plurality of thermocouples 204 that are disposed in the recesses 560-1, 560-2 are electrically insulated from the body 202 via an electrically insulative material that surrounds the corresponding portions of the plurality of thermocouples 204.

Figure 9:
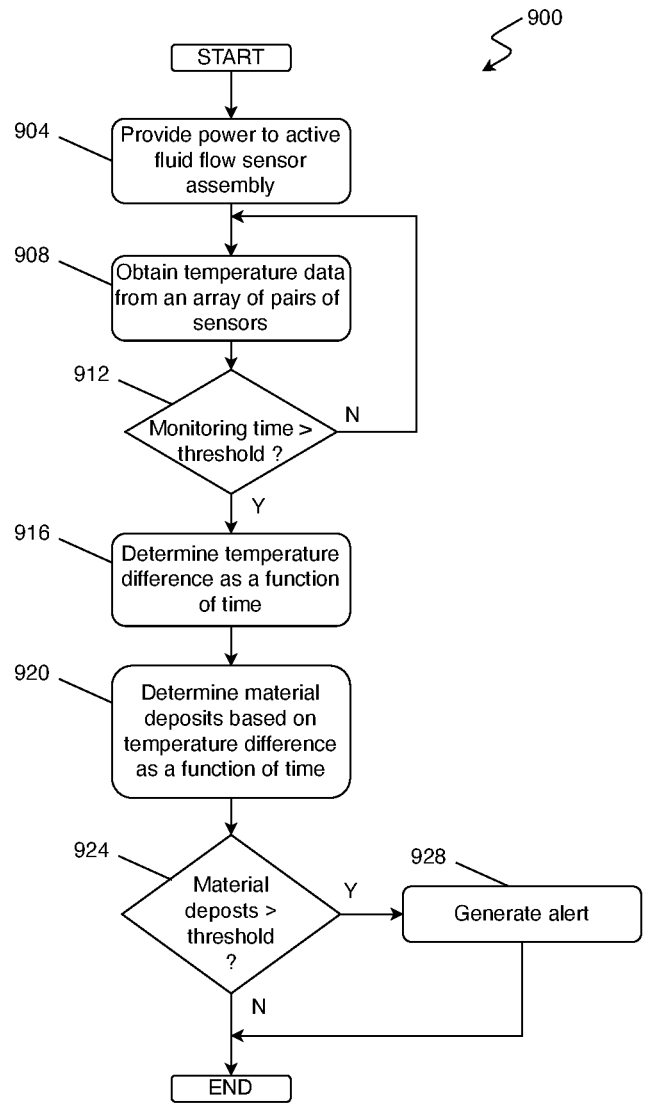
FIG. 9 is a flowchart for determining whether a conduit of a fluid flow system is clogged according to a method the present disclosure.

Referring to FIG. 9, a flowchart illustrating an example routine 900 for determining whether the thermal system 10 is clogged is shown. At 904, the controller 300 (e.g., the heater control module 302) provides power to the active fluid flow sensor assembly 200-6 (i.e., one of the active fluid flow sensor assemblies 200-3, 200-5). At 908, the controller 300 (e.g., the sensor data module 304) obtains temperature data from an array of pairs of sensors, such as the plurality of thermocouples 204 and/or the temperature sensing device 216. At 912, the controller 300 determines whether a monitoring time is greater than a threshold value (e.g., a predefined time value, a dynamic time value that is adjusted based on various characteristics of the thermal system 10, among others). If so, the routine 900 proceeds to 916. Otherwise, the routine 900 proceeds to 908.

At 916, the controller 300 (e.g., the sensor data module 304) determines a temperature difference at the corresponding location of the conduit 110 as a function of time. At 920, the controller 300 (e.g., the buildup detection module 306) determines the amount of material deposits based on the temperature difference as a function of time. At 924, the controller 300 (e.g., the alert module 308) determines whether the amount of material deposits is greater than a threshold material deposits value. If the amount of material deposits is greater than the threshold material deposits value, the routine 900 proceeds to 928, where the controller 300 generates an alert indicating the conduit 110 is clogged. The alert can indicate that a maintenance action is needed at a particular location at the conduit 110 and/or a type of maintenance action needed at the particular location. The alert is communicated to a remote computing system, a display communicatively coupled to the controller 300, among others, to notify a user of the maintenance action. Otherwise, if the amount of material deposits is less than the threshold material deposits value at 924, the routine 900 ends.

Figure 10:
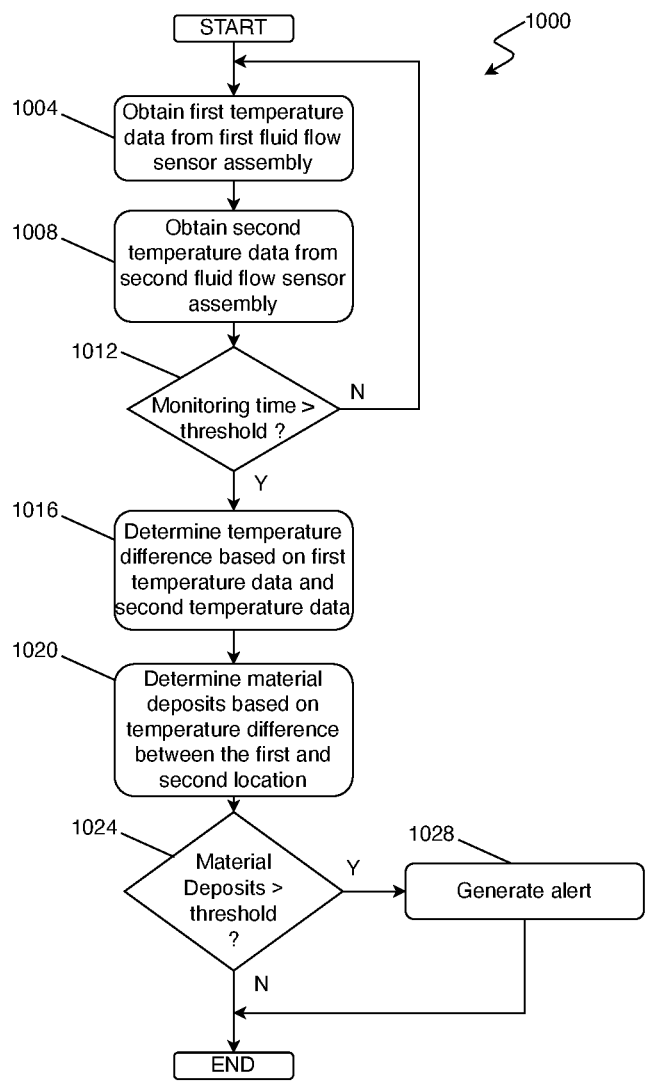
FIG. 10 is a flowchart for determining whether a conduit of a fluid flow system is clogged according to another method the present disclosure.

Referring to FIG. 10, a flowchart illustrating an example routine 900 for determining whether the thermal system 10 is clogged is shown. At 1004, the controller 300 (e.g., the sensor data module 304) obtains first temperature data from a first fluid flow sensor assembly 200 (e.g., the active fluid flow sensor assembly 200-3 that includes a two-wire heater) disposed at a first location along the conduit 110. At 1008, the controller 300 (e.g., the sensor data module 304) obtains second temperature data from a second fluid flow sensor assembly 200 (e.g., the active fluid flow sensor assembly 200-5 that includes a two-wire heater) disposed at a second location along the conduit 110, where the second location is spaced at a given distance apart longitudinally from the first location. In some forms, the fluid flow sensor assemblies 200 at the first and second locations includes the same or different types of sensors (i.e., the plurality of thermocouples 204 and the temperature sensing device 216). In one variation, the routine 1000 can obtain temperature data from one or more fluid flow sensor assemblies in addition to the temperature data from the first and second flow sensor assemblies.

At 1012, the controller 300 determines whether a monitoring time is greater than a threshold value (e.g., a predefined time value, a dynamic time value that is adjusted based on various characteristics of the thermal system 10, among others). If so, the routine 1000 proceeds to 1016. Otherwise, the routine 1000 proceeds to 1004. At 1016, the controller 300 (e.g., the sensor data module 304) determines a temperature difference of the first and second locations based on the first temperature data and the second temperature data. At 1020, the controller 300 (e.g., the buildup detection module 306) determines the amount of material deposits based on the temperature difference between the first and second location. At 1024, the controller 300 (e.g., the alert module 308) determines whether the amount of material deposits is greater than a threshold material deposits value. If the amount of material deposits is greater than the threshold material deposits value, the routine 1000 proceeds to 1028, where the controller 300 generates an alert indicating the conduit 110 is clogged. The alert can indicate that a maintenance action is needed at a particular location at the conduit 110 and/or a type of maintenance action needed at the particular location. The alert is communicated to a remote computing system, a display communicatively coupled to the controller 300, among others, to notify a user of the maintenance action. Otherwise, if the amount of material deposits is less than the threshold material deposits value at 1024, the routine 1000 ends.

With reference to FIGS. 11-14, another band clamp assembly 1100 is illustrated. The band clamp assembly 1100 in this form is also used to secure a sensor assembly 200-8 to the conduit 110. The sensor assembly 200-8 may be similar or identical to the sensor assemblies 200-6, 200-7 described above and therefore will not be described again in detail. The structure and function of the band clamp assembly 1100 is generally similar or identical to the band clamp assembly 500 described above, apart from the variations as described in the following.

The band clamp assembly 1100 includes a flexible mounting strap 1102, a mounting member 1104, a pair of locking members 1106 and a plurality of biasing members 1110. The flexible mounting strap 1102 includes opposed attachment ends 1103 and a plurality of bands 1112 spaced apart from each other and extending between the opposed attachment ends 1103. The flexible mounting strap 1102 is configured to wrap around the conduit 110 such that each of the attachment ends 1103 is removably coupled to a connecting portion 1136 of a respective locking member 1106, thereby securing the sensor assembly 200-8 to the conduit 110. Each of the attachment ends 1103 includes an aperture 1114 formed therein, which in one form is rectangular as shown. In other forms, the apertures 1114 may be circular, oval, or any other suitable shape for securing the flexible mounting strap 1102 to the pair of locking members 1106 while remaining within the scope of the present disclosure.

Figure 11:
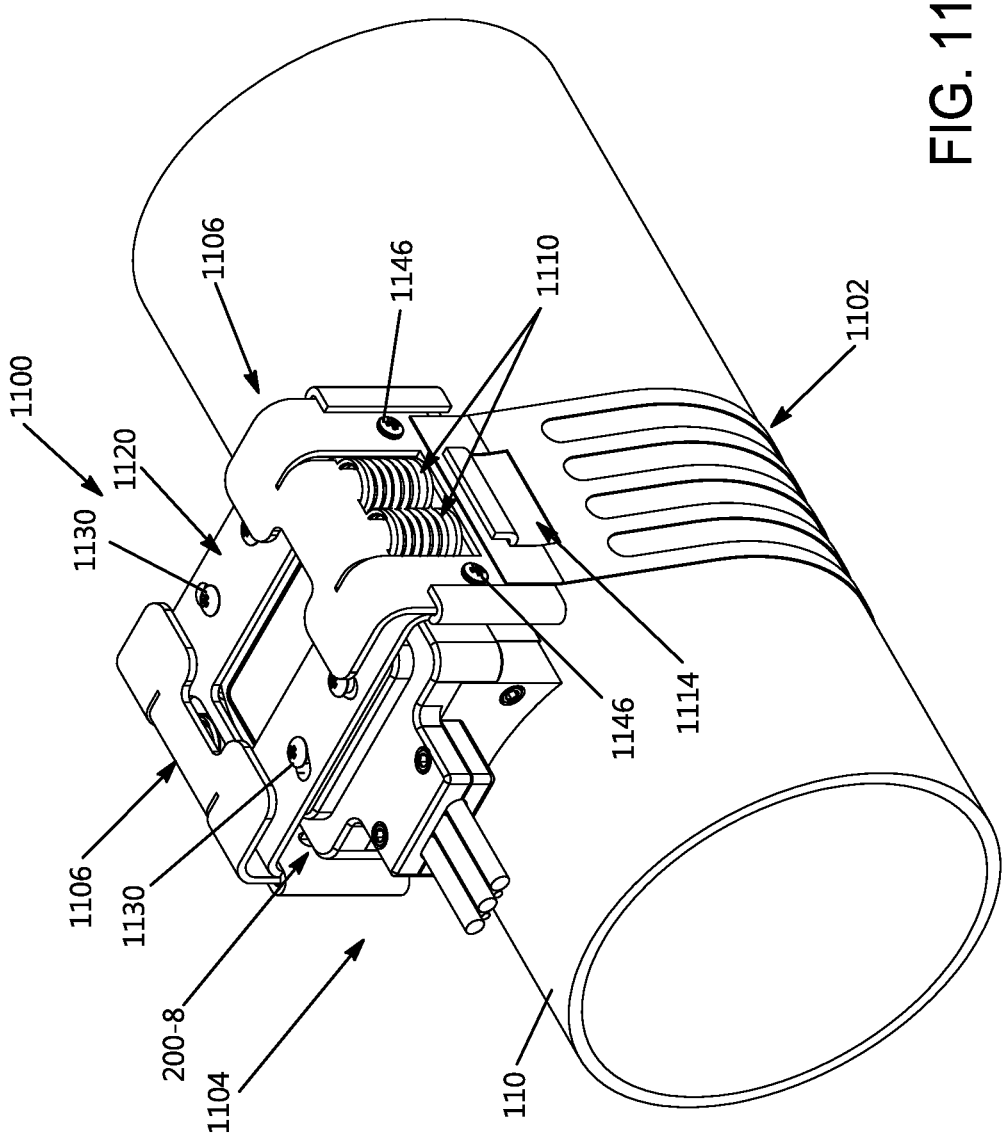
FIG. 11 is a perspective view of another band clamp assembly securing a sensor assembly to the conduit.
Figure 12:
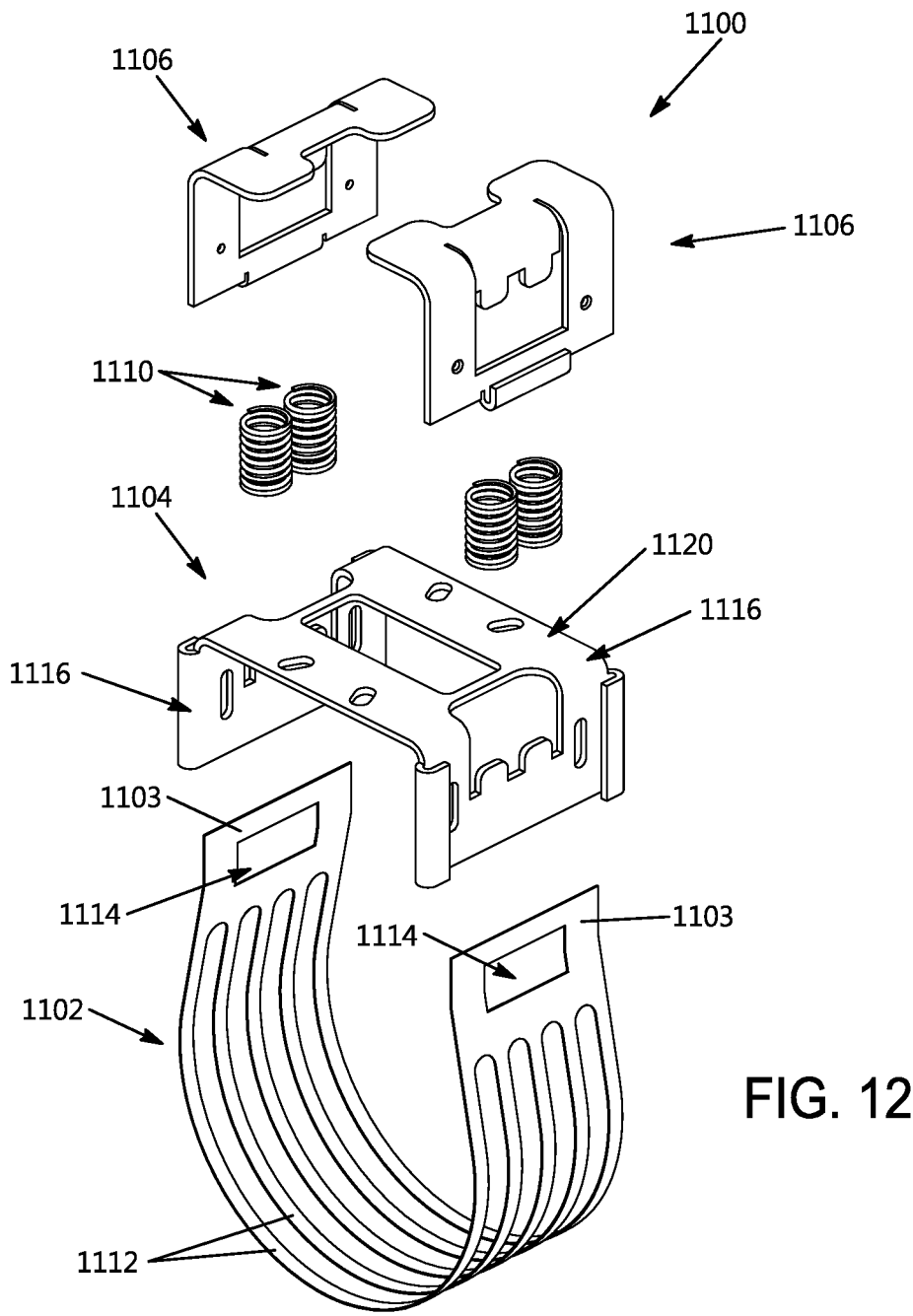
FIG. 12 is an exploded view of the band clamp assembly of FIG. 11.
Figure 12A:
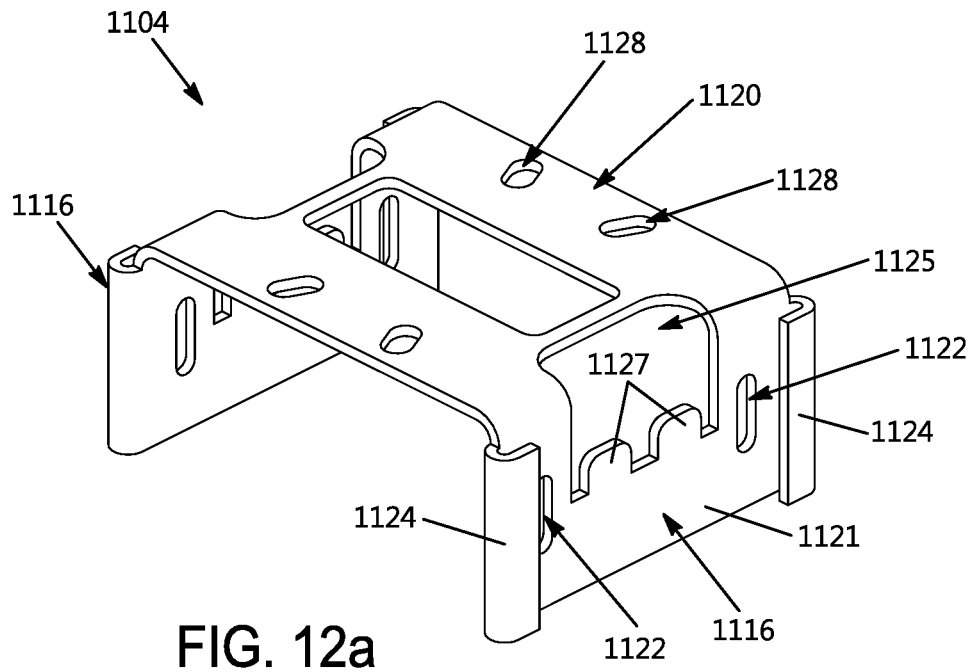
FIG. 12a is a perspective view of a mounting member of the band clamp assembly of FIG. 11.
Figure 12B:
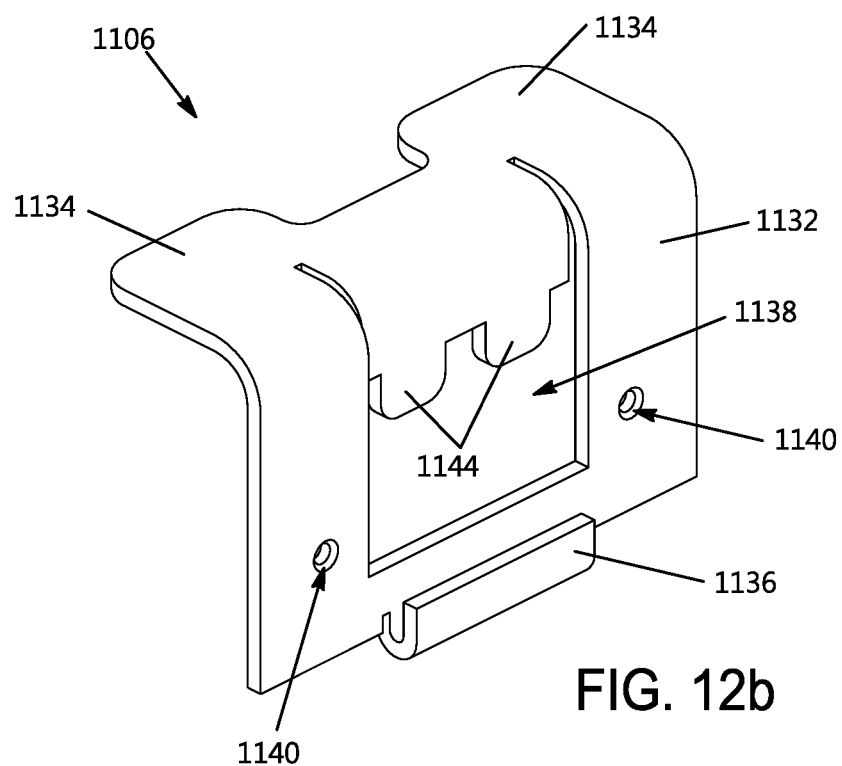
FIG. 12b is a perspective view of one locking member of the band clamp assembly of FIG. 11.
Figure 13:
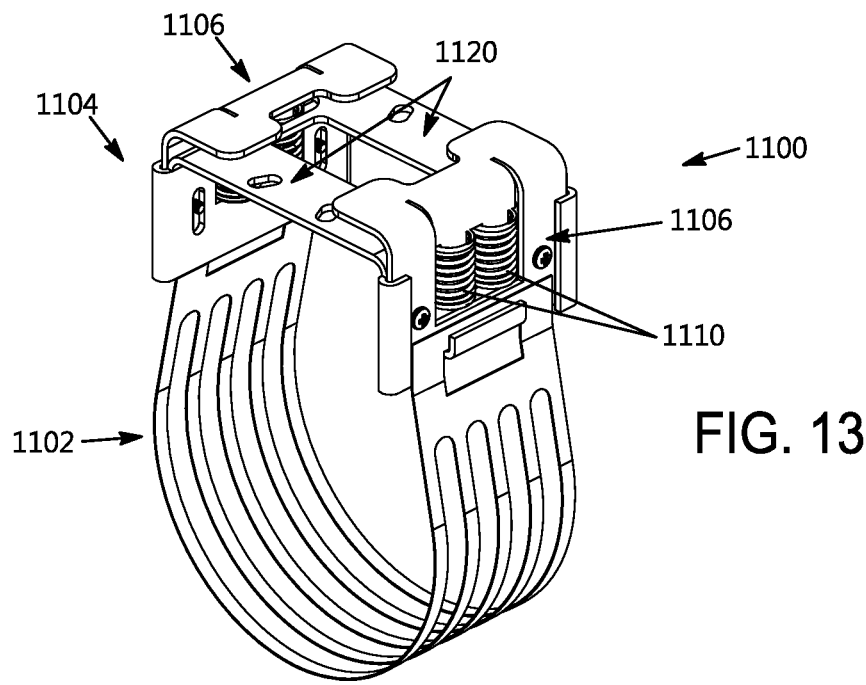
FIG. 13 is a perspective view of the band clamp assembly of FIG. 11.
Figure 14:
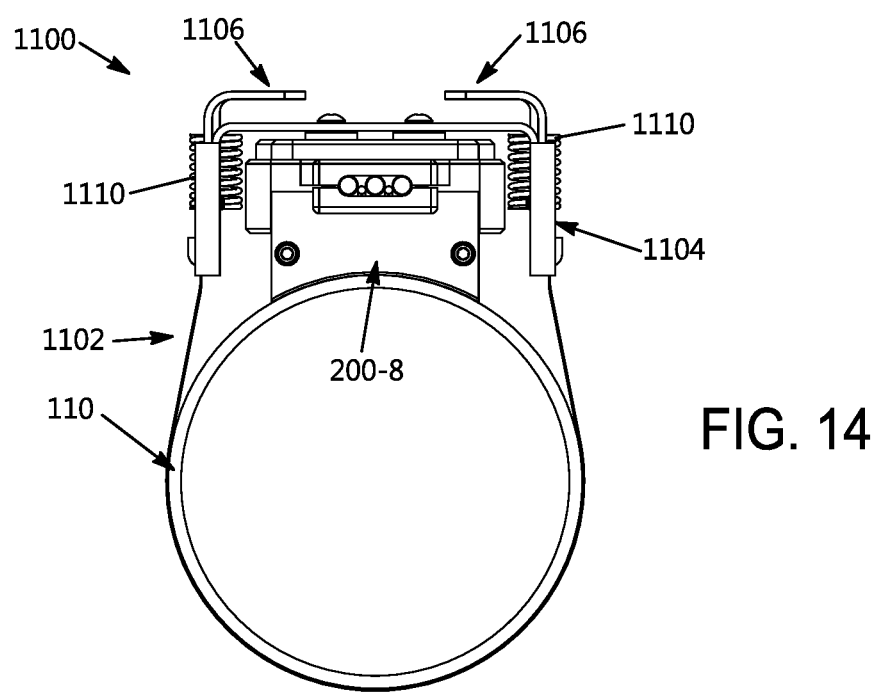
FIG. 14 is a front view of the band clamp assembly of FIG. 11.

With reference to FIGS. 11 and 14, the mounting member 1104 is generally U-shaped and is configured to mount the sensor assembly 200-8. With reference to FIGS. 11, 12, 12a, and 13, the mounting member 1104 includes opposing side arms 1116 (FIGS. 12 and 12a) and a plurality of cross-members 1120 extending between upper ends of the side-arms 1116. Although the mounting member 1104 is shown in the example illustrated as a unitized structure, in some forms, the cross-members 1120 may be separate parts connected to the side arms 1116 via fasteners or any other suitable attachment means. Each side arm 1116 includes a body 1121 and a pair of guides 1124 in which the side arms 1116 translate, as described in greater detail below. The body 1121 defines a cutout 1125 and a pair of elongated slots 1122 formed at or near opposing ends thereof and oriented in a vertical direction. A pair of projections 1127 are spaced apart from each other and are configured to retain a respective biasing member 1110 in a set position. The pair of guides 1124 extend from respective ends of the body 1121 and cooperate with the body 1121 to define slots that receive and guide a respective locking member 1106 as the respective locking member 1106 translates. The plurality of cross-members 1120 include apertures 1128 formed therein. Fasteners 1130 (FIG. 11) such as bolts or screws, for example, extend through the apertures 1128 and at least partially through the sensor assembly 200-8 thereby securing the mounting member 1104 and the sensor assembly 200-8 to each other.

Each locking member 1106 is generally L-shaped and is slidably received in the guides 1124 of the mounting member 1104. Each locking member 1106 is mounted to the body 1121 of the respective side arm 1116 of the mounting member 1104 and is configured to be removably coupled to a respective attachment end 1103 of the flexible mounting strap 1102. Each locking member 1106 includes a body 1132, a pair of tabs 1134, and a connecting portion 1136. The body 1132 defines a cutout 1138 and a pair of openings 1140 formed at or near opposing ends thereof. The openings 1140 are aligned with the slots 1122 of the body 1121. In this way, fasteners 1146 (FIG. 11) extend through the openings 1140 and the slots 1122 to mount the locking member 1106 to a respective side arm 1116 of the mounting member 1104. When the locking member 1106 is mounted to the respective side arm 1116 of the mounting member 1104, the elongated slots 1122 allow the locking member 1106 to slide up and down relative to the mounting member 1104. A pair of projections 1144 are spaced apart from each other and are configured to further retain a respective biasing member 1110 in a set position.

The pair of tabs 1134 are spaced apart from each other and extend inwardly from an upper end of the body 1132 (i.e., the pair of tabs 1134 extend over the mounting member 1104). The pair of tabs 1134 are configured to contact the cross-members 1120 of the mounting member 1104 to inhibit further downward movement of the locking member 1106 relative to the mounting member 1104. Stated differently, the cross-members 1120 act as a stop for the locking member 1106 when the locking member 1106 translates downward. The connecting portion 1136 extends from a lower end of the body 1132 and cooperates with the body 1132 to define a slot that is configured to receive a respective attachment end 1103 of the flexible mounting strap 1102 (i.e., the connecting portion 1136 extends through the aperture 1114 in the flexible mounting strap 1102 such that a portion of the respective attachment end 1103 is received in the slot). In this way, the flexible mounting strap 1102 is secured to the locking member 1106.

Each biasing member 1110 is received in respective cutouts 1125, 1138 of the mounting and locking members 1104, 1106, respectively, and are configured to bias a respective locking member 1106 upwardly and away from the mounting member 1104. The biasing members 110 are mounted between the projections 1127, 1144. In this way, the biasing members 1110 are inhibited from moving in a vertical or horizontal direction.

With continued reference to FIGS. 11-14, assembly of the sensor assembly 200-8 to the conduit 110 using the band assembly 1100 will be described in detail. First, the sensor assembly 200-8 is connected to the cross-members 1120 of the mounting member 1104 as described above. Next, the sensor assembly 200-8 is disposed on the conduit 110 such that the sensor assembly 200-8 engages the conduit 110. Then, the locking members 1106 are forced downwardly by a user such that the flexible mounting strap 1102 wraps around the conduit 110 and the attachment ends 1103 of the flexible mounting strap 1102 are secured to the locking members 1106 as described above. Once the attachment ends 1103 are secured to the locking members 1106, the locking members 1106 are released such that the biasing members 1110 bias the locking members 1106 upwardly. In this way, the flexible mounting strap 1102 is inhibited from disengaging from the locking members 1106, thereby securing the sensor assembly 200-8 to the conduit 110. Disassembly of the sensor assembly 200-8 from the conduit 110 is accomplished by performing the steps above in the reverse order.

In one variation of the band claim assembly 1100, the sensor assembly 200-8 may snap into engagement with the mounting member 1104. That is, a rear end of the sensor assembly 200-8 includes a slot having an open end. The cross-member 1120 nearest the rear of the mounting member 1104 may include a flexible tab that is received in the slot of the sensor assembly 200-8 until it snaps into engagement with the sensor assembly 200-8 thereby securing the sensor assembly 200-8 to the band assembly 1100. It should be understood that, in such form, the mounting member 1104 alternatively includes a single plate having a flexible tab instead of a plurality of cross-members 1120 with cross-member 1120 nearest the rear of the mounting member 1104 having the flexible tab.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Spatial and functional relationships between elements are described using various terms, including "connected," "engaged," "coupled," "adjacent," "next to," "on top of," "above," "below," and "disposed." Unless explicitly being described as being "direct," when a relationship between first and second elements is described in the present disclosure, that relationship can be a direct relationship where no other intervening elements are present between the first and second elements, and can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sensor for detecting material deposits in a fluid flow conduit, the sensor comprising:
   a body; and
   an array of pairs of temperature sensors electrically coupled to each other and disposed within the body, each pair of temperature sensors spaced a distance apart along a primary flow direction of the fluid flow conduit, wherein the array of pairs of temperature sensors are arranged in multiple rows and columns, and wherein the rows of the array of pairs of temperature sensors are stacked in a radial direction of the fluid flow conduit.

2. The sensor according to claim 1 further comprising a heater secured to an exterior portion of the body.

3. The sensor according to claim 2 further comprising an insulation member disposed over the heater.

4. The sensor according to claim 2, wherein the heater defines a geometry matching a geometry of the exterior portion of the body.

5. The sensor according to claim 1, wherein the body defines an interior portion with a geometric profile matching an exterior geometry of the conduit.

6. The sensor according to claim 1, wherein the body is a material selected from the group consisting of Aluminum Nitride (AlN) and Boron Nitride.

7. The sensor according to claim 1, wherein the array of pairs of temperature sensors are selected from the group consisting of thermocouples, RTDs, thermistors, and an integrated circuit temperature transducer.

8. The sensor according to claim 1, wherein the body defines a plurality of interior apertures, and a temperature sensor of each of the pairs of temperature sensors is disposed within an interior aperture of the plurality of interior apertures.

9. The sensor according to claim 8, wherein at least a portion of the plurality of interior apertures is disposed at an interior portion of the body.

10. The sensor according to claim 8, wherein the interior apertures extend longitudinally, along the primary flow direction.

11. The sensor according to claim 8, wherein the interior apertures extend transversely, normal to the primary flow direction.

12. The sensor according to claim 11, wherein at least some of the temperature sensors are spring-loaded within the interior apertures.

13. The sensor according to claim 1 further comprising a heat sink secured to an exterior portion of the body.

14. The sensor according to claim 1 further comprising a mounting device adapted to secure the body to the conduit.

15. The sensor according to claim 14, wherein the mounting device is one of a bracket assembly and a band clamp assembly.

16. A system for detecting material deposits in a fluid flow conduit, the system comprising:
the sensor according to claim 1;
a mounting means for securing the sensor to the fluid flow conduit;
a computing device configured to determine temperatures from the array of pairs of temperature sensors, monitor differences in thermal response of the array of pairs of temperature sensors over time, and determine a presence of material deposits based on the differences in thermal response; and
a clog indication means.

17. The system according to claim 16 further comprising:
a heater disposed proximate the sensor; and
a controller in communication with the heater,
wherein the controller activates the heater to generate auxiliary heat for active detection of the material deposits.

18. The system according to claim 16, wherein the computing device is configured to provide pulsed power to the array of pairs of temperature sensors, thereby generating heat for active detection of the material deposits.

19. A sensor for detecting material deposits in a fluid flow conduit, the sensor comprising:
a body;
an array of pairs of temperature sensors electrically coupled to each other and disposed within the body, each pair of temperature sensors spaced a distance apart along a primary flow direction of the fluid flow conduit; and
a heater secured to an exterior portion of the body,
wherein the array of pairs of temperature sensors are arranged in multiple rows and columns,
wherein the rows of the array of pairs of temperature sensors are stacked in a radial direction of the fluid flow conduit.

20. The sensor according to claim 19, further comprising a mounting device adapted to secure the body to the conduit.

21. A method of detecting material deposits in a fluid flow conduit, the method comprising:
detecting temperatures from an array of pairs of temperature sensors electrically coupled to each other and disposed proximate the fluid flow conduit;
monitoring differences in temperatures of the array of pairs of temperature sensors over time; and
determining a presence of material deposits based on the differences in temperature,
wherein the array of pairs of temperature sensors are arranged in multiple rows and columns, and
wherein the rows of the array of pairs of temperature sensors are stacked in a radial direction of the fluid flow conduit.

22. The method according to claim 21 further comprising actively applying heat proximate the array of pairs of temperature sensors.

23. A sensor for detecting material deposits in a fluid flow conduit, the sensor comprising:
a body; and
an array of pairs of temperature sensors electrically coupled to each other and disposed within the body, each pair of temperature sensors spaced a distance apart along a primary flow direction of the fluid flow conduit,
wherein the array of pairs of temperature sensors comprises rows stacked in a radial direction of the fluid flow conduit.

24. The sensor according to claim 23 further comprising a heater secured to an exterior portion of the body.

25. The sensor according to claim 24 further comprising an insulation member disposed over the heater.

26. The sensor according to claim 24, wherein the heater defines a geometry matching a geometry of the exterior portion of the body.

27. The sensor according to claim 23 wherein the rows are spaced apart from each other in the radial direction of the fluid flow conduit.

* * * * *